United States Patent
Reshetov et al.

(10) Patent No.: US 7,102,636 B2
(45) Date of Patent: Sep. 5, 2006

(54) SPATIAL PATCHES FOR GRAPHICS RENDERING

(75) Inventors: Alexander V. Reshetov, San Jose, CA (US); Yevgeniy P. Kuzmin, Moscow (RU); Denis V. Ivanov, Moscow (RU); Alexander N. Yakovlev, Tambov (RU)

(73) Assignee: Intel Corporation, Santa Clara, CA (US)

( * ) Notice: Subject to any disclaimer, the term of this patent is extended or adjusted under 35 U.S.C. 154(b) by 248 days.

(21) Appl. No.: 09/823,582

(22) Filed: Mar. 31, 2001

(65) Prior Publication Data

US 2002/0171644 A1 Nov. 21, 2002

(51) Int. Cl.
*G06T 17/00* (2006.01)

(52) U.S. Cl. ............ 345/420; 345/419; 345/421; 345/427; 345/442; 345/581; 345/590

(58) Field of Classification Search ........... 345/420, 345/421, 427, 581, 419, 442, 590; 382/286
See application file for complete search history.

(56) References Cited

U.S. PATENT DOCUMENTS

| | | | | |
|---|---|---|---|---|
| 5,751,931 A * | 5/1998 | Cox et al. | ............ | 345/440 |
| 5,771,341 A | 6/1998 | Huddy | ............ | 395/119 |
| 5,774,133 A | 6/1998 | Neave et al. | ............ | 345/505 |
| 6,300,958 B1 * | 10/2001 | Mallet | ............ | 345/442 |
| 6,366,289 B1 * | 4/2002 | Johns | ............ | 345/543 |
| 6,483,518 B1 * | 11/2002 | Perry et al. | ............ | 345/590 |
| 6,498,607 B1 * | 12/2002 | Pfister et al. | ............ | 345/423 |
| 6,704,018 B1 * | 3/2004 | Mori et al. | ............ | 345/502 |
| 6,704,693 B1 * | 3/2004 | Fan et al. | ............ | 703/1 |
| 6,760,784 B1 * | 7/2004 | Bodin et al. | ............ | 719/323 |

OTHER PUBLICATIONS

J.F. Blinn Simulation of wrinkled surfaces. Computer Graphics 12(3), pp. 286-292, 1978.

F. Neyret Modeling, Animating, and Rendering Complex Scenes using Volumetric Textures. IEEE Transactions on Visualization and Computer Graphics, 4(1), pp. 55-70, Jan. 1998.

J.W. Patterson, S. G. Hoggar, and J.R. Logie. Inverse displacement Mapping. Computer Graphics Forum, 10(2), pp. 129-139, Jun. 1991.

S. Gumbold, and T. Huttner. Multiresolution Rendering with Displacement Mapping. Proceedings of the 1999 Eurograqphics/SIGGRAPH workshop on Graphics hardware, pp. 55-66 1999.

N. Dyn, J. Gregory, and D. Levin. A 4-point Interpolatory Subdivision Scheme for Curve Design. CAGD 2, 1987, pp. 257-268.

(Continued)

*Primary Examiner*—Kimbinh T. Nguyen
(74) *Attorney, Agent, or Firm*—Blakely, Sokoloff, Taylor & Zafman LLP

(57) ABSTRACT

Described are a novel graphical element known as a spatial patch and a system and method for rendering the spatial patch to create computer graphics. The spatial patch may include appearance data and displacement data for each of a plurality of nodes that together specify the color and geometry for typically a small portion of a surface of an object. The appearance and displacement data may be independent and irregular for each of the nodes in order to represent complexly colored and structured objects. The spatial patch may be processed independently and may have internal topology or structure to facilitate parallel processing. Accordingly, the spatial patch offers many quality and processing advantages over polygon mesh representations that have previously been used to create three-dimensional computer graphics.

33 Claims, 19 Drawing Sheets

OTHER PUBLICATIONS

M. Peercy, J. Airey, and B. Cabral. Efficient Bump Mapping Hardware. Proc. Of the 24th annual conference on Computer Graphics and Interactive Techniques, 1997, pp. 303-306.

M. Oliveira, G. Bishop, and D. McAllister. Relief texture mapping. ACM Computer Graphics (Proc. Of SIGGRAPH'2000) pp. 359-368, 2000.

Webpage, Surfels-Surface Elements as Rendering Primitives. Merl Project: Surfels.Retrieved from the internet Mar. 31, 2001. Retrieved from Internet at http://www.merl.com/projects/surfels/ p. 1-4.

Gerald Farin. Curves and Surfaces for Computer—Aided Geometric Design, A Particle Guide, Fourth Edition. Copyright © 1997, 1993, 1990, 1998 by Academic Press. pp. 1-429.

Matthias Zwicker, Markus H. Gross, Hanspeter Pfister. A Survey and Classification of Real Time Rendering Methods, 2000.Printed May 29, 2000, retrieved from Internet Mar. 31, 2001. Retrieved from http://www.merl.com/reports/TR2000-09/TR2000-09.pdr. pp. 1-38.

Hanspeter Pfister, Matthias Zwicker, Jeroen van Baar, Markus Gross. Surfels: Surface Elements as Rendering Primitives, Apr. 2000.Retrieved from Internet Mar. 31, 2001.Retrieved from http://www.merl.com/reports/TR2000-10/TR2000-10.pdf. pp. 1-10.

Mason Woo, Jackie Neider, Tom Davis, Dave Shreiner. Open GL Programming Guide Third Edition, The Official Guide to Learning Open GL, Version 1.2 pp. 495-530. Printing Feb. 5, 2000. Copyright © 1999.

"Subdivision for Modeling and Animation", 2000 SIGGRAPH, Course Description or synopsis. Retrieved from Internet Jul. 19, 2001. Retrieved from website http://mrl. nyu.edu/publications/subdiv-course2000/. pp. 1-4.

M. Deering, Data Complexity for Virtual: Where do all the Triangles Go? *IEEE Virtual Reality Annual International Symposium* (VRAIS), pp. 357-363. Seattle, Sep. 1993.

L. Kobbelt, Interpolatory Subdivision on Open Quadrilateral Nets with Arbitrary Topology. *Computer Graphics Forum (Proc. of Eurographics '96)*, 15, pp. 409-420.

\* cited by examiner

SPATIAL PATCHES FOR GRAPHICS RENDERING

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The invention relates generally to the field of computer graphics. More particularly, the invention relates to a method and apparatus for representing a graphical object with one or more spatial patches and rendering the graphical object based on this representation.

2. Background Information

In order to provide accurate and immersing computer graphics, it is desirable to use computer graphics models that accurately represent the visual qualities of real-world objects. FIG. 1 illustrates a three-dimensional stage 100 that is at least conceptually used by many computer graphical models to generate computer-generated images. As shown, a spherical object 110 on the stage is viewed from a viewing location 120, which may be an eye or a virtual camera. A light 130 illuminates the object 110.

The viewing location 120 which may be an origin of a world coordinate system may indicate a viewing distance to the object 110, a viewing direction, and one or more viewing angles that may affect what parts of the object 110 are visible. For example, only the side of the object 110 that faces the viewing direction 120 may be visible. A view port 140 and the viewing location 120 may create a viewing frustum 160 that indicates interior objects or portions of objects that are visible. A view plane 150 may contain a projection 155 of the object 110.

Traditionally, three-dimensional objects such as spherical object 110 have been modeled or represented as a combination of a polygonal mesh representation that models the geometry of the three-dimensional object and textures applied to the polygons to represent surface appearances. Both curved and flat surfaces are turned into polygons. This is often known as tessellation. The vertices or corners of the polygons are assigned positions and colors and are used in lighting and shading during rendering. Polygonal representations based on this approach have been preferred because they can provide high frame rates and rapid display of the representations. Most often, triangular meshes have been used because modern hardware has been designed and/or optimized for these representations.

FIG. 2 conceptually illustrates representation of a portion 220 of the surface of a three-dimensional object 210 using a triangular mesh representation. A display 200 shows the three-dimensional object 210 having the portion 220. The portion 220 includes five joined non-overlapping triangles 250, 252, 254, 256, and 258 that form a connected set of triangular planar surfaces that represent the portion 220 of the surface of the object 210. The five triangles share a centralized common vertex. A texture map is applied to each of the five triangles, giving each of the triangles a texture internal area. This textured internal area is represented as textured areas 260, 262, 264, 266, and 268 for triangles 250, 252, 254, 256, and 258, respectively.

As expected, the smoothly varying surface of the spherical object 210 is poorly represented by the triangles (a large number of triangles is needed to represent the object with an acceptable accuracy). This example represents a general and major problem with polygonal mesh representations, namely that polygonal mesh representations provide poor approximations of real-world objects having shapes that vary smoothly, rather than in discrete planes corresponding to the polygonal boundaries. FIG. 3 shows an exemplary human head 300 represented using a prior art triangular mesh representation. Triangle 310, which is clearly visible in the head 300, reveals the inadequacies of this prior art approach for representing real curved objects when realism is desirable.

A technique known as bump mapping is sometimes used to create the appearance of a natural surface or geometric details on a planar area of a polygon. Bump mapping is based on approximating illumination from the surface by perturbing interpolated normals over the polygonal surfaces using stored bump maps. However, no real displacement of pixels is achieved, and bump mapping techniques are not effective for silhouettes and other surfaces that do not directly face the virtual camera. Among other problems with bump mapping, the bump maps require additional storage and self occlusion does not happen correctly.

Accordingly, in the prior art, the only practical way of overcoming the limitation illustrated in FIG. 3 is to provide a large number of very small polygons, which significantly increases the number of computations and slows rendering. Often such sacrifices are not acceptable. Accordingly, in the prior art approaches the need to rapidly display computer graphics has forced an inaccurate and unnatural approach for representing real-world objects, and such approaches are limiting the visual quality and appeal of the computer graphics.

BRIEF DESCRIPTION OF THE SEVERAL VIEWS OF THE DRAWINGS

The novel features believed characteristic of the invention are set forth in the appended claims. The present invention is illustrated by way of example, and not by way of limitation, in the figures of the accompanying drawings and in which like reference numerals refer to similar elements. The invention itself, however, as well as a preferred mode of use, will best be understood by reference to the following detailed description of an illustrative embodiment when read in conjunction with the accompanying drawings:

DETAILED DESCRIPTION OF THE INVENTION

A method and apparatus are described for representing an object with one or more spatial patches and processing the one or more spatial patches to create computer graphics for the object. The spatial patch may include displacement data to represent the geometry of the object and appearance data to represent the color of the object. Advantageously, such representations may provide a more accurate representation of the object with less data and may allow the creation of more appealing computer graphics.

In the following description, for the purpose of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Exemplary Spatial Patch

Figure 4:
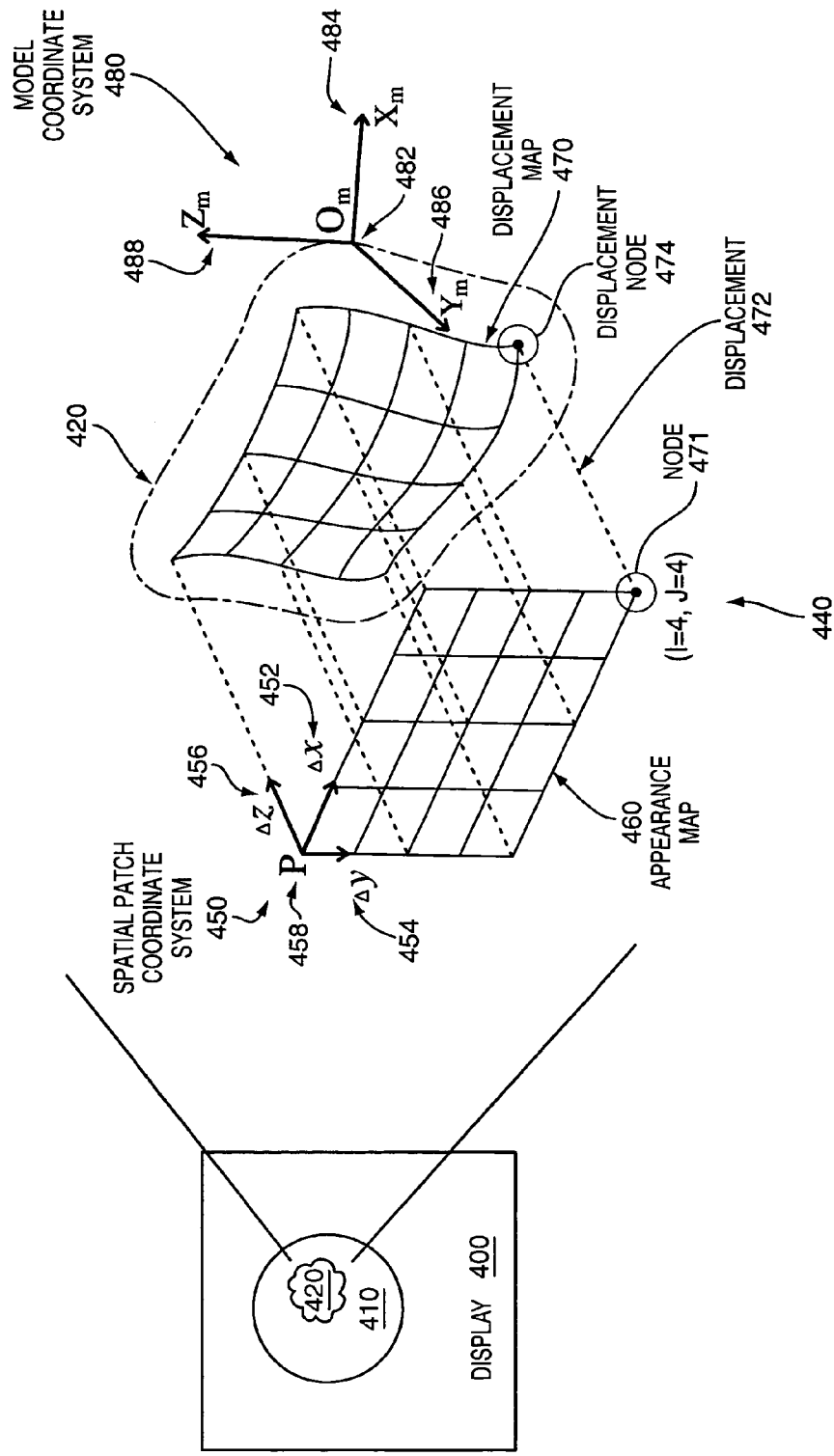
FIG. 4 conceptually illustrates an approach for representing a spherical object with a spatial patch, according to one embodiment.

FIG. 4 conceptually shows representing a surface portion 420 (a larger surface portion is shown for purposes of illustration) of a spherical object 410 with a spatial patch 440. By appropriately processing the spatial patch and the spatial patch data, the portion 420 of the object may be presented on a display device 400, printed using a printer, recorded on film, or stored on a computer-readable medium in a video format (e.g., for DVD, etc.). Processing may include rendering the spatial patch, which is to be interpreted broadly as creating computer graphics or images based on the spatial patch, and rasterizing the spatial patch to determine pixel values.

The term "spatial patch" will be used to refer to a novel graphical element or rendering primitive that is used to represent typically a small portion of an object and is used to generate computer graphics. Typically, the spatial patch comprises appearance data, such as color data, and geometry data, such as displacement data, that are used to indicate the appearance and position of a plurality of nodes. The spatial patch may also comprise additional appearance data such as transparency, reflectivity, etc.

The term "node" will broadly be used to refer to a point of the spatial patch. According to one embodiment a node is a potentially independent undisplaced point of the spatial patch that may have displacement data (e.g., a displacement distance) that indicates a corresponding displaced node. The displaced node may have a location in a spatial patch coordinate system that corresponds to a point typically on the surface of the object. For example, the displaced node may be a point on a "surface" of the spatial patch having a location that is a displacement distance away (e.g., a distance in a z-direction) from a corresponding node that lies in a base plane (e.g., an x,y-plane) of the spatial patch.

The spatial patch 440 includes a coordinate system 450. The term "coordinate system" will be used to refer to a system for representing a two, three, or multi-dimensional space using indexes into that space, typically numbers. The coordinate system 450 shown is a Cartesian coordinate system comprising a coordinate system origin P 458, an x-axis 452, a y-axis 454, and a z-axis 456. The x-axis 452, the y-axis 454, and the z-axis 456 are mutually perpendicular and intersect at the origin 458. According to one embodiment, and in contrast to triangle vertices, a coordinate system may be local to a spatial patch and independent of and unrelated to coordinate systems of other spatial patches. This independence may facilitate parallel processing of the two spatial patches. Alternatively, origins of spatial patches may be implicitly arranged or connected according to a grid or mesh in order to reduce the likelihood of "cracks" occurring due to a lack of overlap. To illustrate use of the coordinate system 450, the exemplary coordinates (1,1,1) could be used to identify or index a point with x, y, and z coordinates all equal to 1 in coordinate system 450, which could be a point, node, or displaced node on the spatial patch 440. The coordinate system 450 defines coordinates in a Euclidian space. In other embodiments, the spatial patch 440 may be based on a different coordinate system.

The spatial patch 440 also comprises an appearance map 460 that contains appearance data to display the portion 420 of the object 410 in a computer graphics image. The appearance data may include color data, transparency data, brightness data, reflectivity data, and other types of data that are desired. According to one embodiment, the appearance map 460 includes appearance data for each of a plurality of nodes including node 471. Displaced node 474 may have an appearance or color that is associated with the node 471. In one embodiment the spatial patch may have independent appearance (e.g., color) data for each of a plurality of evenly spaced nodes arranged in a square or rectangular pattern. The appearance data may include color data, and other optional appearance data such as transparency and reflectivity data. For example, in one embodiment, the appearance map 460 includes a plurality of bits sufficient to indicate a color defined by a combination of Red, Green, and Blue in an RGB color scheme and a plurality of bits sufficient to indicate a transparency value for each of the nodes. Those skilled in the art will recognize that other color representations are possible, such as Cyan/Magenta/Yellow/Black (CMYK).

Incremental distances $\Delta x$ along the x-axis and $\Delta y$ along the y-axis are used to denote a distance between nodes in the x-direction and y-direction, respectively. Often $\Delta x$ and $\Delta y$ will be constant for a spatial patch or for all spatial patches. That is, the nodes may be regularly or equally spaced and arranged in a grid. It may also often be the case that $\Delta x$ equals Δy. Often the nodes will be arranged in an inherent predetermined arrangement such as a regular rectangular grid or array, such as is shown in FIG. 4, where the spatial patch has an equally-spaced array of 5×5 nodes. Assuming that the first index in each coordinate is zero, the node 471 will have indices (i=4, j=4) into the appearance map or array that allow location of node 471 in the x,y-plane at coordinates $(x_i, y_j)$ based on Δx and Δy. For example, the coordinates of node 471 may be determined as $B_{i,j}$=P+4Δx+4Δy. In this way, the amount of data needed to represent a position of the node may be reduced or omitted altogether, since the node indices, rather than more rigorous and detailed node coordinate information may be stored for the node. In this way, the indices (i, j) are likened to indices used to locate "texture" coordinates in a texture map. Accordingly, in some cases a node may be referred to as a texel, without implying any unneeded limitations associated with traditional texels. In other embodiments, texture coordinates may be explicitly defined in the patch representation. This will typically involve additional information to represent each node.

Rather than a 5×5 block of nodes, the spatial patch may have any size, number of nodes, shape, and arrangement of nodes that is convenient for the intended application and use. Typically, spatial patches have a size small enough to maintain heterogeneity of displacement information to a sufficiently low level, which usually translates into fewer bits used to represent the displacements. This may depend on the geometric characteristics of the object. Typically regularly shaped spatial patches, such as boxes, rectangles, spheres, triangles, and other shapes will be preferred over irregular shaped spatial patches, although this may not be the case in certain implementations. Considering in further detail a square or rectangular shaped spatial patch, without loss of generality to other shapes, often the spatial patch will have an equal number of nodes along both sides (e.g., 3×3). According to one embodiment, a spatial patch may have a multiple of $2^{-k}+1$ (two raised to the power of k plus one) nodes (e.g., 3, 5, 9, 17, etc.). For example, in the case of a square or rectangular grid of nodes there may be $2^{-k}+1$ nodes one or both sides. This may provide efficiencies for recursive procedures such as used during clipping because there is a central node for each division. For example, a spatial patch may have 3×3, 5×9, or 17×17 nodes. Also, in some cases the total number of nodes will be an even multiple of eight (e.g., 4×4, 16×16, 32×32, 64×64, and other sizes), which may provide other efficiencies. In cases of a rectangular grid, a spatial patch may have $2^{-k}$ nodes along a side. Alternatively, any other sized and shaped spatial patch may be used, including 1×1, 3×3, 1×8, 4×8, and others. Additionally, when an object is represented with multiple spatial patches, it will frequently be desirable for each of the spatial patches to have a consistent size, shape, and nodal arrangement, although this is not required, and representation of one or more objects with heterogeneous spatial patches is contemplated.

The spatial patch 440 also includes a displacement map 470 that includes displacement data to display the portion 420 of the object 410 in a computer graphics image. Unlike a rasterized triangle in a triangle mesh representation, displacements in the spatial patch are not limited to having a constant gradient. That is, points on a triangular plane do not have independent displacement but nodes in a spatial patch may have independent displacements. The displacements for nodes may be irregular, non-uniform displacements and may vary from node-to-node and region-to-region to conform to the desired geometry of a surface 420 of the object 110. That is, in the same way that a pixel in a bitmap may have an independent color or degree of freedom, each node of the spatial patch may have an independent displacement or positional degree of freedom. Advantageously, this may allow accurate representation of complex surfaces. For example, displacements in the spatial patch may have smoothly varying maximums (e.g., a bump) or minimums (e.g., a dent or hole), which is not possible during rasterization of a triangle mesh.

According to one embodiment, the displacement map 470 includes a plurality of bits sufficient to indicate a displacement or distance of a node from a base plane defined by the x-axis and y-axis. For example, a displacement 472 is shown for an exemplary node 471 located at (i=4, j=4) in the x,y-plane. The representation of displacement is flexible, and any desired degree of displacement representation can be achieved by varying the number of bits to represent the displacement. In one case, displacements may be either positive or negative and may indicate displacement from a convenient reference, such as a node in an x,y-plane. Because small portions of the surface of the three-dimensional object are likely to be relatively smooth, displacement can typically be represented with much less information or bits than color information. For example, about 80% of the information for a node is generally color information and the remaining 20% displacement information. According to one embodiment, displacement data and appearance data are provided for the same node, so as to simplify construction and use of the spatial patch, although other embodiments are contemplated. For example, a color value and a displacement distance may be provided for each of a plurality of nodes in a regular square or rectangular grid of evenly spaced nodes. Multiple nodes or regions of a spatial patch may share displacement data or appearance data. For example, a block of nodes (e.g., a quarter of a spatial patch) may have the same displacement. Accordingly, the spatial patch represents the object using real displacements rather than simplifying the surface of the object, as is done in the polygonal representations.

Typically the spatial patch provides a realistic approximation to the real or desired appearance and geometry of the object and may be acquired from real objects, artificially created, or generated using a combination of these approaches. For example, the appearance map 460 may be acquired by photographing a portion of a real object or by manually creating a texture using a computer graphics package. Likewise, the displacement data could be acquired using a real object and range-sensing equipment, or could be generated using computer graphics software. Combinations of both approaches are also possible.

Accordingly, as shown, the spatial patch 440 may be used to represent a surface portion 420 of an object 410. Typically, the spatial patch has both appearance data and displacement data for the same nodes, which offers advantages over texture triangle mesh-texture mapping approaches in which the texture and geometry data is separated. Advantageously, since the spatial patch may store displacement data separately for each of the nodes, the position and appearances of the nodes can be used to create a representation that more closely approximates the smooth curvature of the spherical object 410. This may greatly improve the representation of three-dimensional objects, particularly three-dimensional objects that have complicated geometries and smooth surfaces that are poorly represented by triangle meshes. Thus, spatial patches may have uses and advantages in any of the graphical and media arts, such as, but not limited to, video games, virtual reality, television (e.g., three-dimensional television), Virtual Reality Modeling Language (VRIvIL), 3D chat, films (e.g., computer generated images/animation and special effects), CAD, presenting graphics over the Internet, and in other environments.

FIG. 4 also shows a model coordinate system 480. The model coordinate system 480 comprises an origin $O_m$ 482, an x-axis $X_m$ 484, a y-axis $Y_m$ 486, and a z-axis $Z_m$ 488. Often, the model coordinate system 480 is related to the spatial patch coordinate system 450. For example, the model coordinate system 480 mayt be unique for an object or shape represented by a collection of spatial patches and may be used to define the spatial patch coordinate system 450. This may include defining the origin P 458 and the x, y, and z-axis 454, 456, 458 in the model coordinate system 480. In one case, different spatial patches including spatial patch 440 are defined or registered to one common model coordinate system such as model coordinate system 480. This may allow simplified analysis during rendering the spatial patches. Of course, the alternative is also possible, but may include more sophisticated algorithms and analysis.

As discussed above, typically the spatial patch is associated with a coordinate system, such as coordinate system 450. In addition to Cartesian coordinate systems, other types of coordinate systems are contemplated, such as those based on a radial distance and one or more angles.

Figure 5:
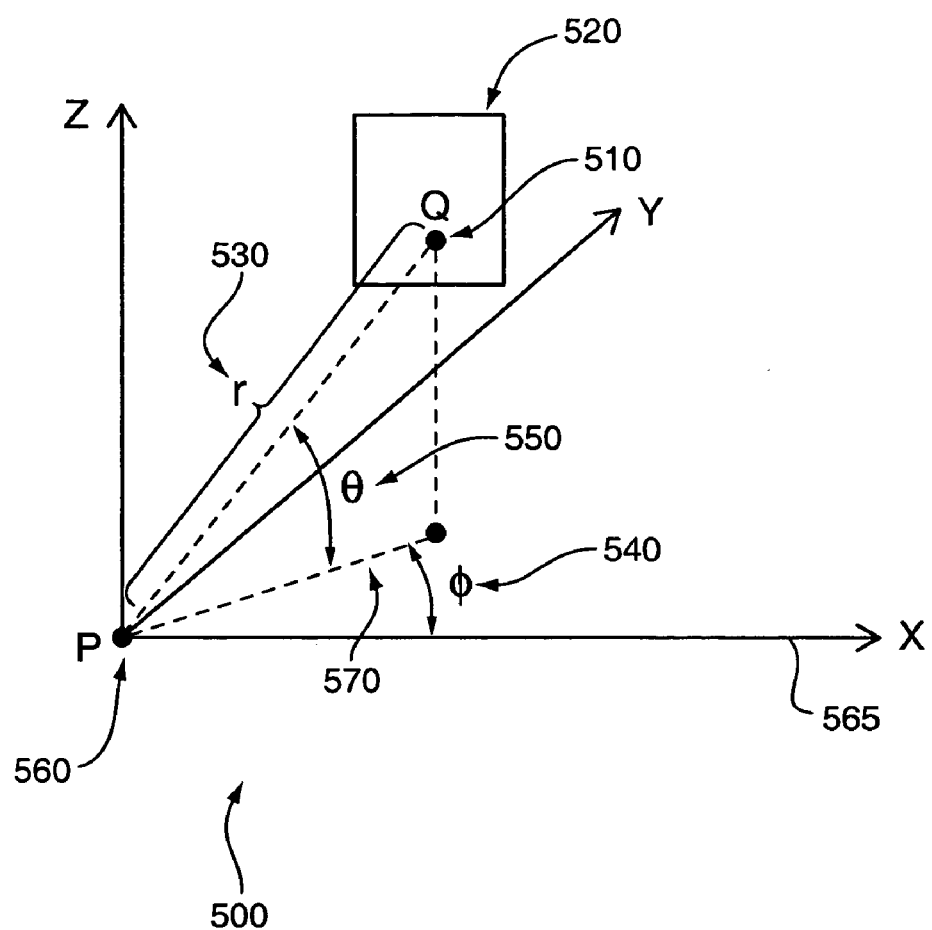
FIG. 5 conceptually illustrates an exemplary radius-based coordinate system, according to one embodiment.

FIG. 5 shows an exemplary coordinate system 500 in which a point or node P 510 of a spatial patch 520 is indexed by a radius r 530, an angle phi 540, and an angle theta 550. The radius is a distance from an origin 560 to the node P 510. The angle phi 540 is an angle in an x,y-plane, such as the plane containing the x-axis 452 and y-axis 454 of FIG. 4, between the x-axis 565 and a line of projection 570 onto the x,y-plane. The angle theta 550 is an angle between the line of projection 570 and radius 530. Thus, a node P 510 on a spatial patch 520 may be represented in terms of a radius 530, an angle phi 540, and an angle theta 550 in the coordinate system 500 shown in FIG. 5. The radius 530 may be used to express displacement, either directly, or relative to some other radius or value.

Referring once again to FIG. 4, it is worth noting that in some cases different types of coordinate systems may be used for the spatial patch coordinate system 450 and the model coordinate system 480. For example, one may be based on a radius, such as shown in FIG. 5, and one may be Cartesian.

Exemplary Spatial Patch Data Structure

Figure 6:
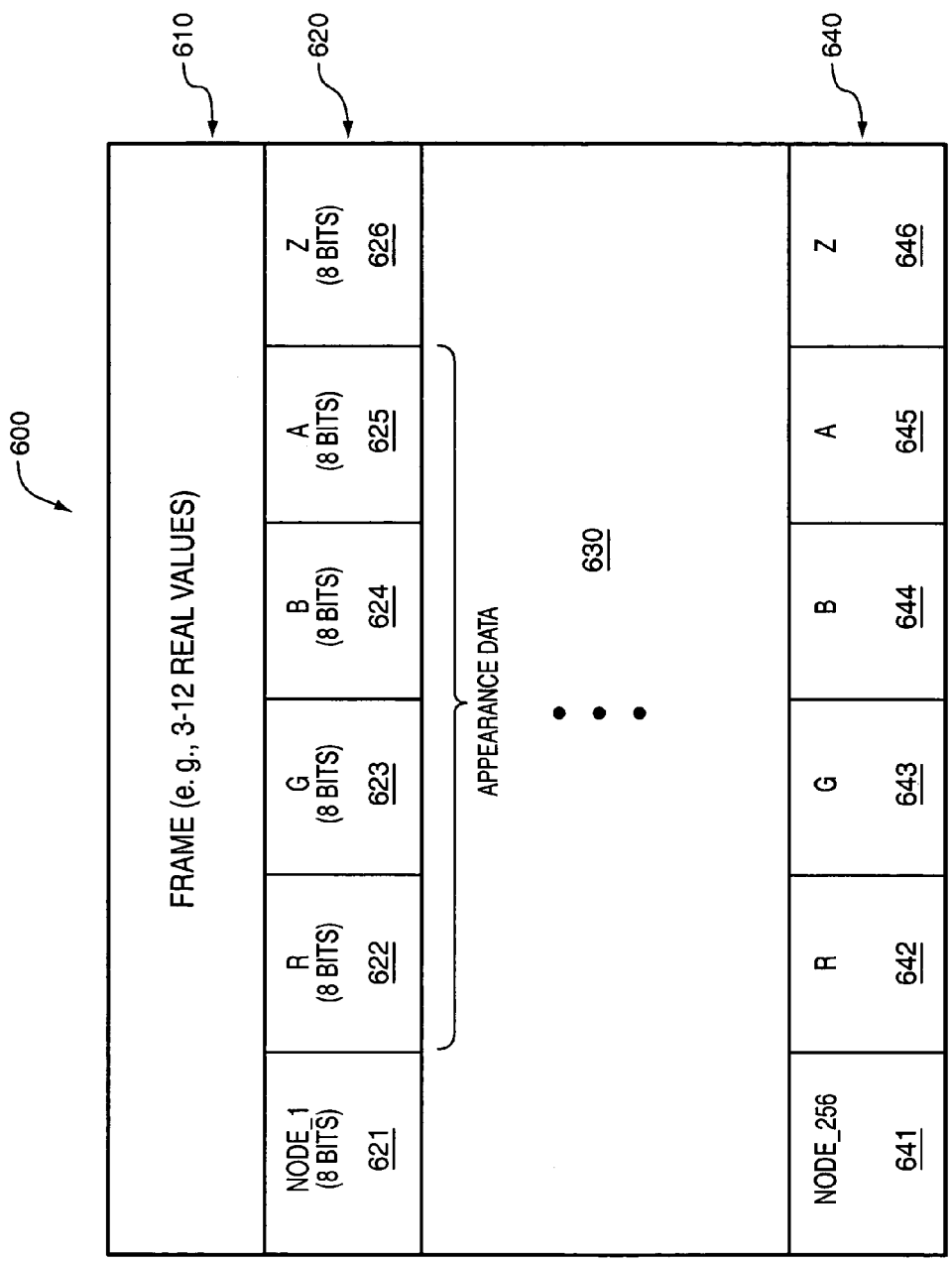
FIG. 6 conceptually illustrates types and structure of data in an exemplary spatial patch, according to one embodiment.

FIG. 6 conceptually shows an exemplary spatial patch data structure, according to one embodiment. For convenience, often the spatial patch data structure or the data of the spatial patch will often be referred to simply as a spatial patch. Typically, the spatial patch data structure may be stored on a machine-readable medium in a machine readable or computer-accessible format.

The spatial patch 600 includes coordinate data 610 that may be used to indicate a coordinate system such as the coordinate system 450. Typically the coordinate data 610 includes between about 3–12 real values sufficient to indicate the coordinate system of the spatial patch. In the case of a local frame based on a Cartesian coordinate system, the coordinate system data contains real values to indicate the origin, the x-axis, the y-axis, and the z-axis. For Cartesian coordinate system, values for z-axis can be omitted, because it can be reconstructed from x-axis and y-axis using "Right Hand Thumb Rule". According to this the z-axis may be determined from this content by finding a vector perpendicular to the x-axis and y-axis. This may allow determination of the direction of the z-axis. A length or scale of the z-axis is often explicitly stored (e.g., stored as $\Delta z$). Rather than storing it explicitly, it may be deduced from information available for the x- or y-axis, but this approach may constrain the internal structure of the spatial patch. In alternative embodiments, it may be desirable to reduce the number of such calculations, and the coordinate system data 610 may include explicit data indicating the coordinate system. Optionally, if all patches are using the same axes, these values can be omitted in the patch definition.

In this example, the spatial patch 600 includes appearance data and displacement data for each of 256 nodes. A first logical grouping of data 620 within the spatial patch 600 relates to node coordinate data 621 appearance data 622–625, and displacement data 626 for a first node. The node coordinate data 621 includes 8 bits sufficient to represent 256 possible values and to distinguish the first node from other nodes of the spatial patch 600. Red color data 622, green color data 623, and blue color data 624 each contain 8 bits sufficient to indicate respective red, green, and blue color values corresponding to a particular desired final blended color.

In other implementations fewer or more bits may be desired. One simplification is to eliminate node coordinates, assuming that indices of each node are equal to its node coordinates. Additionally, the data 622–624 could be significantly reduced in the case of a black and white color scheme or a gray scale color scheme. Additionally, in one embodiment where a color look-up table is used, 8 bits total (e.g., 01000011) may be provided to indicate the final RBG blended color value. This may be used to index into a look-up table containing 256 distinct final blended colors to determine that it corresponds to color with index equal to 67 (e.g., 100110100001). This color index may indicate a unique red value (e.g., 1001), green value (e.g., 1010) and blue value (0001) sufficient to display a pixel with the final blended RGB color value indicated in the original 8 bits.

According to one embodiment, the node structure or configuration of a spatial patch is defined implicitly, rather than explicitly. For example, the nodes may be inherently specified for the spatial patch according to a consistent, regular, and evenly spaced rectangular node grid in an x,y-plane, rather than storing an explicit indication of the node on a per-node basis, which although more flexible would usually need more storage. Advantageously, this allows the spatial patch to represent a true geometry of a surface by using displacement values that store in less total storage than triangle vertices that do not have such an implicit structure or configuration. This beneficial property allows for significant reduction of geometry information compared to triangular meshes.

The spatial patch 600 also includes transparency (alpha) data 625 to specify transparency of the first node. The transparency data may indicate that the first node is transparent, which would through processing allow subsurface nodes (e.g., interior or background nodes) to be reflected in the computer graphics representation. In the exemplary spatial patch 600, eight bits are used to represent transparency of the first node, although fewer or more bits could be used as desired and depending on the importance of the transparency for the object and the computer graphics. According to another embodiment, transparency data may be replaced and/or supplemented with other data such as reflectivity data. According to one embodiment, the alpha channel may be used to process invalid nodes that are to be omitted during rendering. For example, given such an invalid node, a special color value (e.g (0, 0, 0) in RGB) may be used for such nodes.

The spatial patch 600 also includes displacement data 626 to specify displacement of the first node relative to a reference location such as a base plane, the origin, or another node. For example, assuming the coordinate system is an x,y,z-coordinate system, the displacement may be in the direction of the positive z-axis and may indicate a distance from the x,y-plane. In one embodiment, the displacement data may indicate displacement relative to a different reference than the x,y-plane. For example, the displacement may be relative to another node, group of nodes, or to an average displacement for the spatial patch. Other displacements are also contemplated. As shown, the displacement data is represented with eight bits, although more or less bits may be used. The number of bits may depend on the size of the spatial patch, the nature and surface properties of the object, and upon the displacement reference.

Characteristically, in contrast to polygonal mesh representations that typically require connectivity information and topology information, spatial patches may be rendered without this information based on the coordinate system, appearance map data, and displacement map data. Although close spatial patches may intersect, the common or overlapping regions correspond to the same points on the object in absolute terms and will be properly visualized.

The spatial patch 600 also includes data for the remaining nodes 630, 640. The nature of the data for these nodes may be substantially similar to the data for the first node 620, since frequently it will be easier to process the spatial patch when the data is consistent throughout.

Thus, according to one embodiment, the spatial patch may be represented with a simple data structure that makes data management, extraction, and rendering simple and efficient. Typically, the texture data and the displacement data consist of simple sequential arrays that may be easily processed using Single Instruction stream Multiple Data stream (SIMD) operations, such as an array processor performing one operation on multiple data elements. In some cases, the spatial patch may also be processed using matrix operations, such as texture mapping hardware that is able to simultaneously operate on and combine two different texture maps.

Exemplary Spatial Patch Rendering Unit

Figure 7:
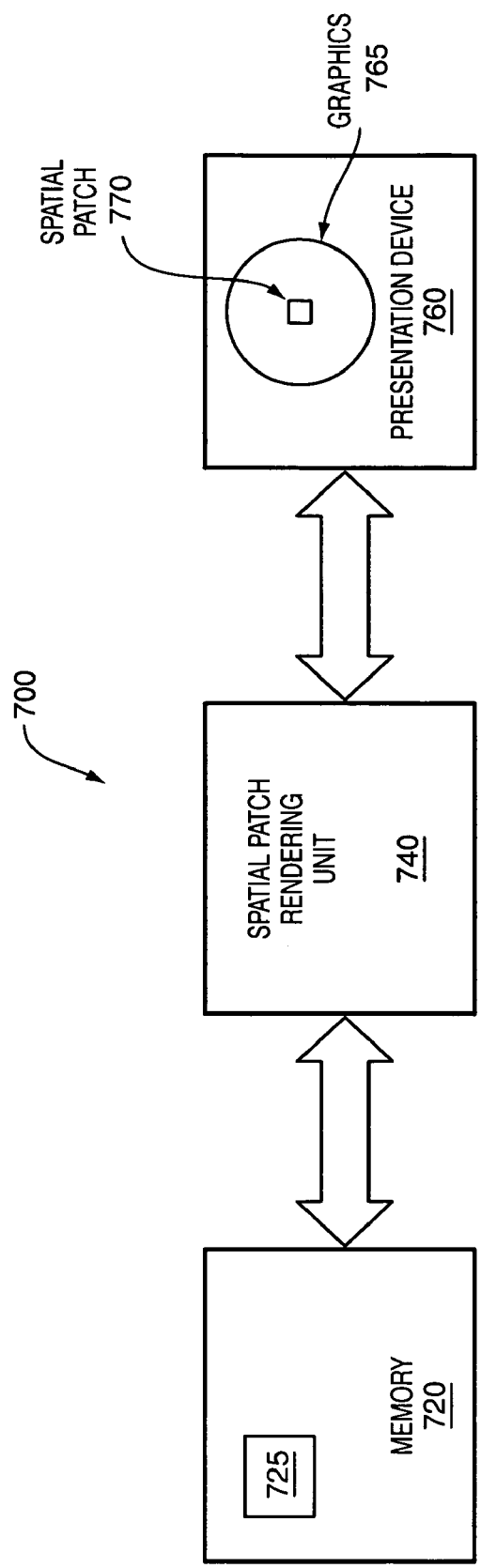
FIG. 7 conceptually illustrates a system for processing a spatial patch, according to one embodiment.

FIG. 7 shows an exemplary system 700 for processing or rendering a spatial patch to generate computer graphics, according to one embodiment. The system 700 includes a memory 720 having stored thereon a spatial patch 725, a spatial patch rendering unit 740 coupled with the memory 720 to receive the spatial patch 725 from the memory 720 and process the spatial patch 725, and a presentation device 760 coupled with the spatial patch rendering unit 740 to receive processed spatial patch data and present computer graphics 765 associated with the spatial patch 725. The computer graphics 765 including at least a graphics portion 770 that directly corresponds to the spatial patch 725.

Figure 18:
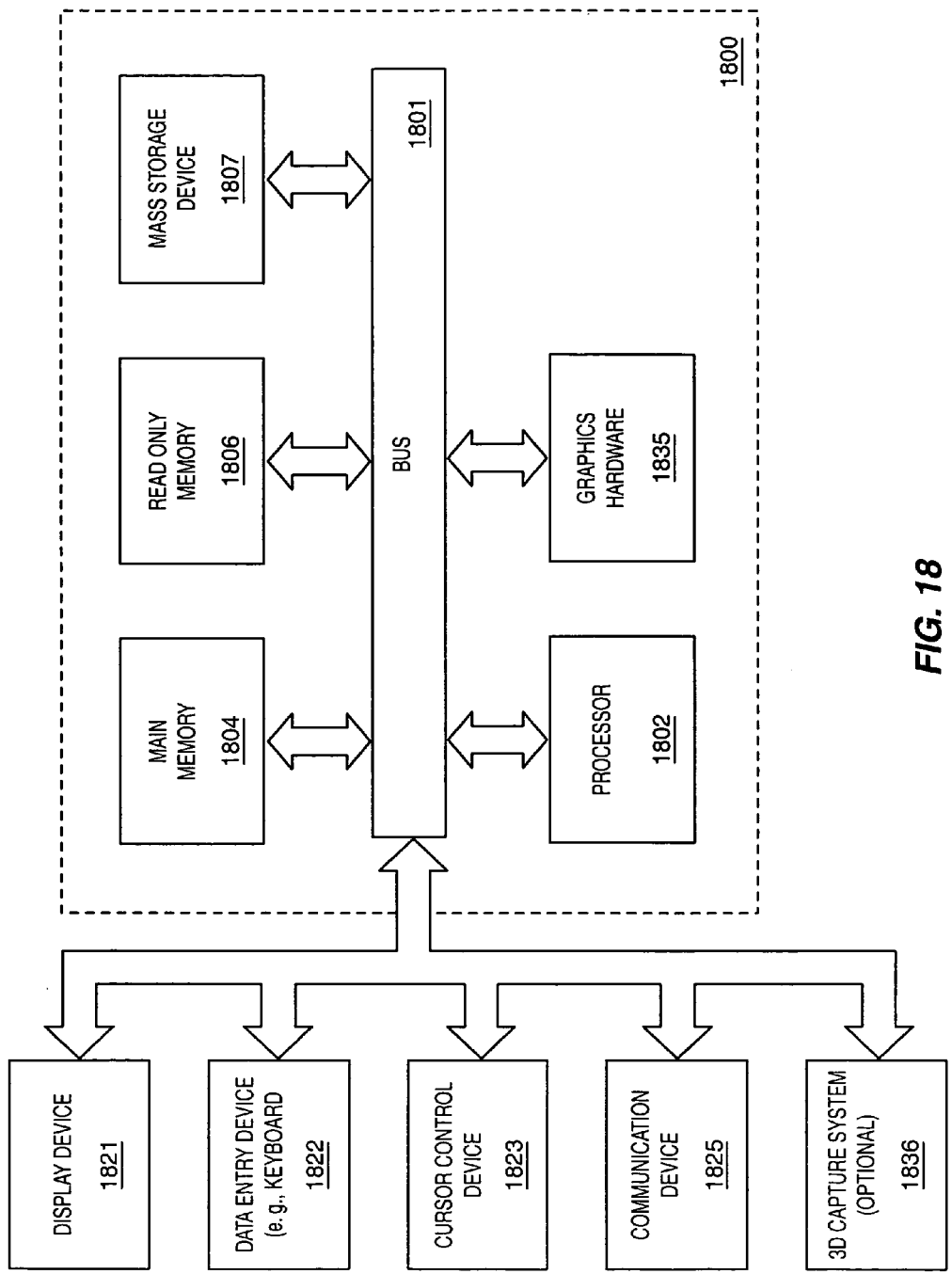
FIG. 18 is a block diagram of a computer system upon which one embodiment of the invention may be implemented.

The memory 720 may be any type of memory capable of storing a spatial patch. Various types of memory, including ROM, RAM, and mass storage devices, are discussed in further detail in FIG. 18. The memory 720 may be any convenient type of memory discussed in FIG. 18 or known to those skilled in the art. The spatial patch 725 may be any of the types of spatial patches discussed elsewhere in the detailed description, such as, but not limited to the spatial patch 600 shown in FIG. 6. Often the spatial patch 725, or any subpart thereof, may be in a compressed form according to a lossy or loss-less compression method and will be correspondingly decompressed either before but typically after accessing the spatial patch 725.

The spatial patch rendering unit 740 may be any type of spatial patch rendering unit 740 and may perform any type of processing needed to transform or render the information content of the spatial patch 725 into a final rendered computer graphics image for presentation to the presentation device 760. According to one embodiment, the spatial patch rendering unit 740 may process or render the spatial patch 725 according to the rendering processing discussed in FIGS. 8AB for method 800. The spatial patch rendering unit 740 may comprise hardware, software, or a combination of hardware and software to render spatial patches. For example, in one embodiment, the spatial patch rendering unit 740 may include a hardware accelerator executing SIMD instructions that exploit the independence, regularity, and uniformity of the spatial patch, and an on-chip fast cache to provide quick memory access. The spatial patch rendering unit 740 may also interact with other hardware and/or software. For example, in one case the rendering unit 740 may use a z-buffer to take advantage of the independence, regularity and uniformity of the spatial patch 725.

The presentation device 760 ultimately receives graphics data corresponding to the processed spatial patch graphics data and presents computer graphics 765 that are associated with the spatial patch 725. In particular, the computer graphics 765 may include at least a small region or portion 770, that directly corresponds to the spatial patch 725.

The presentation device 760 may be any type of presentation device suitable for presenting graphics or images associated with spatial patches. In one embodiment, the presentation device may be a display device such as a computer system display device to display video games or VRML, or a television system display device to display movies having computer generated images or 3D TV. Alternatively, the presentation device may be a a film recorder, a DVD or CD ROM burner, a printer, a plotter, a facsimile machine, or another type of presentation device.

Exemplary Spatial Patch Processing

Figure 8A:
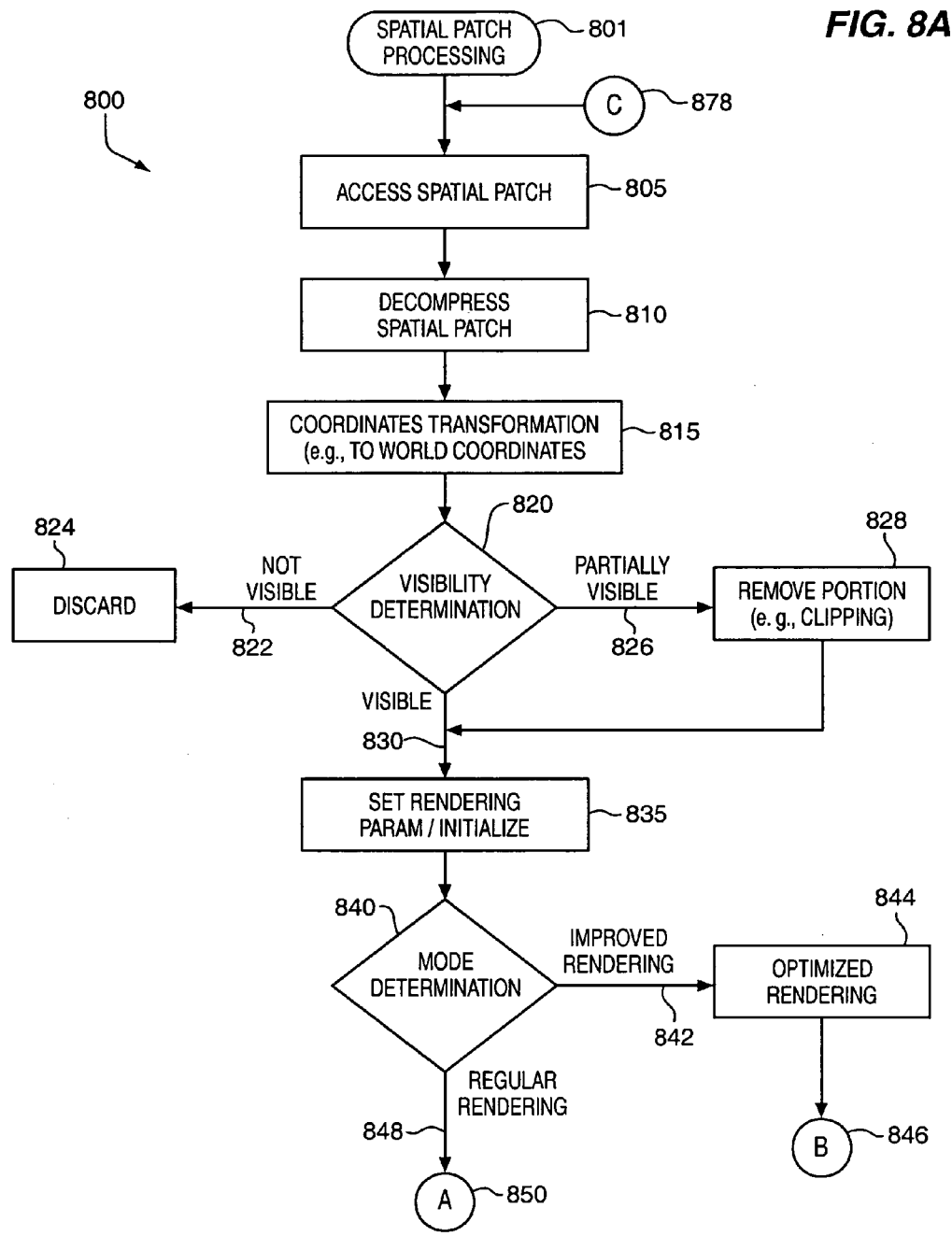
FIGS. 8A–8B conceptually illustrate in block diagram form a method for processing a spatial patch, according to one embodiment.
Figure 8B:
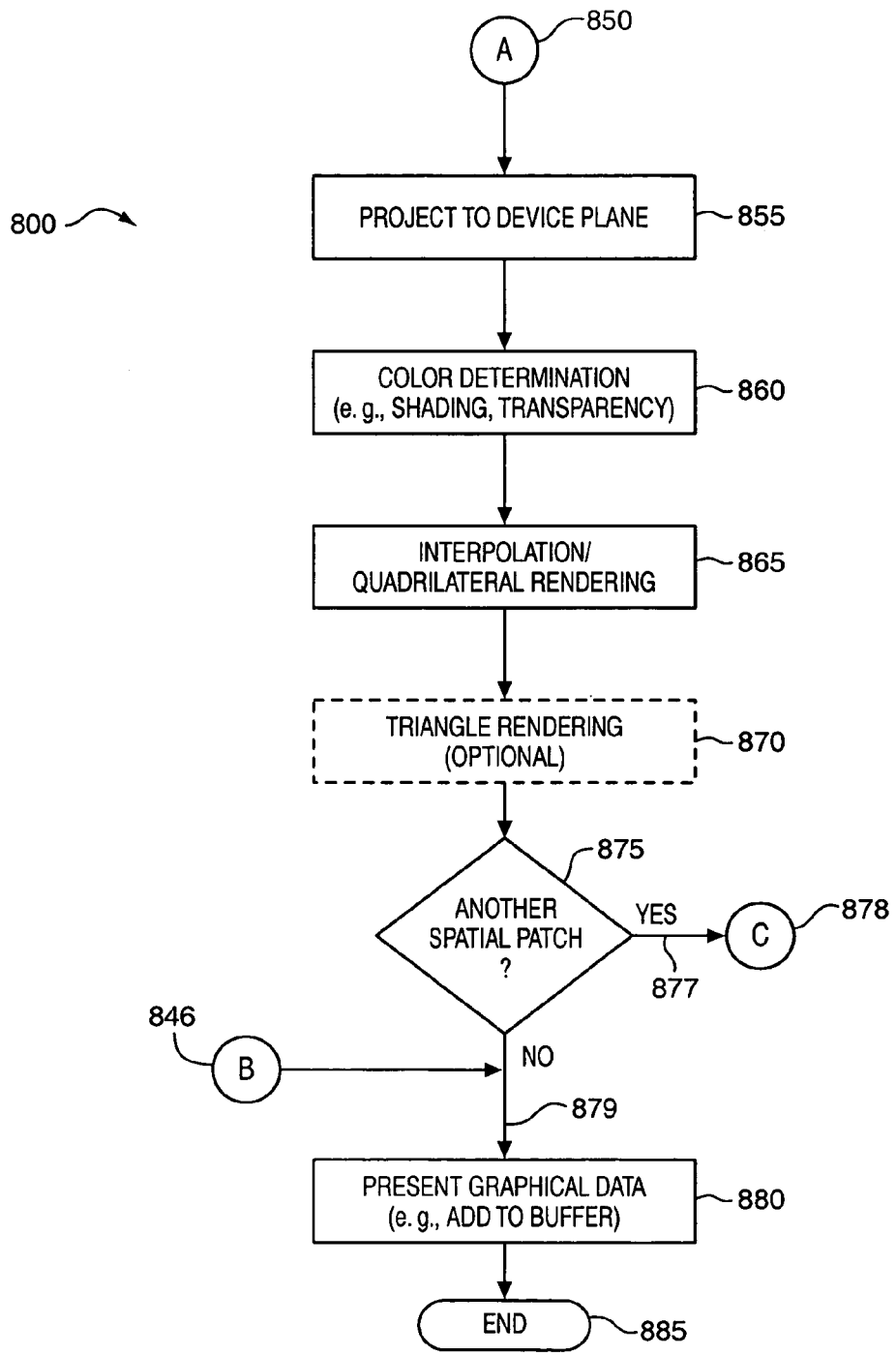

FIGS. 8A and 8B illustrate in block diagram form a method 800, according to one embodiment, for processing spatial patches. The method 800 may be implemented in logic that may include software, hardware or a combination of software and hardware. According to one embodiment, the method 800 may be implemented as a substitute for the standard graphics pipeline used to render triangular mesh representations of graphical objects. Additionally, as will be discussed further below, all or part of method 800 may be implemented on standard graphic pipeline hardware.

Accessing Spatial Patches

The method 800 commences at block 801, and then proceeds to block 805, where one or more spatial patches are accessed. Often the spatial patches will be accessed according to an order of the spatial patches indicated in a computer graphics model. Many different criteria for ordering the spatial patches are contemplated, although often it will be convenient to order the spatial patches based on location of the spatial patch on the surface of a three-dimensional object. That is, spatial patches close on the surface of a three-dimensional object will be close in the ordered arrangement. Alternatively, spatial patches may be ordered by similarity of their internal characteristics (e.g. $\Delta x/\Delta y$) so that information for one spatial patch may be reused for another spatial patch. This may increase cache usage efficiency. The coordinate system data and/or displacement data may be used to provide such order. Hierarchy, pointers, and other means may be employed to increase the speed and efficiency of traversing the model and/or the order. For example, a three-dimensional character in a video game may have face spatial patches front-side spatial patches, and back-side spatial patches, and the face spatial patches may be skipped if the back-side spatial patches are used. In other cases all spatial patches will be traversed and processed.

Hardware or software that processes the spatial patches or that is associated with the computer graphics may also affect access of the one or more spatial patches. For example, a spatial patch rendering unit (hardware or software) may access or request a spatial patch. This access may be object-oriented or image-oriented. Also, an application like a video game may request a spatial patch. Thus, spatial patches may be accessed selectively, without processing other spatial patches. However, often such actions will involve verifying that graphics associated with other spatial patches are not affected.

Those having an ordinary level of skill in the art will recognize that multiple spatial patches may be accessed and processed simultaneously by using pipelined or parallel processing techniques. For example, multiple spatial patch rendering units may be provided to simultaneously access and perform spatial patch processing on different spatial patches. Typically this will increase the speed of rendering computer graphics, although hardware and/or software implementation may be more involved.

Decompressing Spatial Patches

The method 800 advances from block 805 to block 810, where a spatial patch may be decompressed. In many cases the spatial patch will be represented in memory with compressed data in order to reduce the total amount of memory used to store a spatial patch and occasionally to reduce data transmission bandwidth. The compressed data may store the same information or a sufficient amount of the information with less total number of bits compared to a non-compressed form of the spatial patch. The entire spatial patch or any subpart thereof may be compressed. Lossy and loss-less compression techniques used in the prior art for image and texture map compression are contemplated. In one embodiment both the appearance map and the displacement map are compressed. Compression of the displacement map data will typically be substantially similar to one of the well-known techniques available for compressing texture maps and/or images Accordingly, the compressed data will often be decompressed either before or after accessing the spatial patch.

In addition to compression, spatial patches may share a common texture and/or displacement map in order to reduce storage. For example, in the case of dimpled sphere (e.g., a golf ball), one well-chosen appearance map and displacement map may be shared by a plurality of spatial patches rendered in different orientations. A triangular mesh representation may not be capable of achieving the same efficiency.

Transforming Coordinates

The method 800 advances from block 810 to block 815, where coordinate transformation may be performed if necessary. Typically the coordinate transformation will be from spatial patch coordinates, as specified by the coordinate system data to world coordinates. A world coordinate system generally has an origin located at a viewing location (e.g., the eye or virtual camera 120 of FIG. 1) and a z-axis parallel to the viewing direction. World coordinates may be represented with single-precision floating-point numbers, although more or less precision may be desired depending on the application. For example, in certain CAD applications, where precision can be very important, double-precision formats may be desired.

The transformation may be performed in a number of different ways for a spatial patch. In one case, the internal topology or arrangement of nodes within a spatial patch is predetermined (e.g., a regular grid of consistently spaced nodes). In this case, often only the spatial patches coordinate system and origin may be transformed to the destination coordinate system or projected into screen coordinates, such as by using the coordinate system data. Then, each of the separate nodes may be transformed or projected to screen coordinates using the transformed coordinate system and the implicit, predetermined topology and the displacement data for each of the nodes. In this way, transformation of individual nodes to world coordinates may not be needed. This approach may not preserve perspective non-linearity within the patch, but typically works well for small sized spatial patches and may be sufficient for many implementations of spatial patches.

Alternatively, in another embodiment, each node may be transformed to word coordinates. Typically, the transformation will involve accessing displacement data and coordinate data. The coordinate data may indicate a base point, a base plane, or another reference to be used in conjunction with the displacement data. For example, a displaced node may be determined by combining a node and a displacement distance, which may be in a specified z-direction or one that is calculated from information that is specified, and then the displaced node may be transformed to world coordinates much as is done with current triangle mesh representations. Rather than doing these transformations node-by-node for a plurality of nodes of the spatial patch, they may be done using vector and/or matrix operations. In other embodiments the nodes may be transformed based on the proximity of nodes in screen coordinates, which may allow certain optimizations in the transformation.

Frequently, transformation to world coordinates is linear (affine), so that transformation is not needed for every node. However, projection to screen coordinates is often not linear and per-node projection may be used if correct appearance is desired. If this is the case, nodes may be projected first to world coordinates and second to screen coordinates. In this way, the world coordinate system acts as an intermediate state for node coordinates.

Determining Visibility

The method 800 advances from block 815 to block 820, where visibility processing is performed. Typically, visibility processing involves determining whether the spatial patch is relevant for or will be completely, partially, or not at all visible in an intended computer-generated image or graphic.

Visibility processing often involves comparing extents of a spatial patch against extents of a view volume sized in such a way that its inside has some relevancy to objects that appear in the computer graphics and its outside has another relevancy. For example, objects or portions of objects inside the view volume may appear in the computer graphics.

Figure 1:
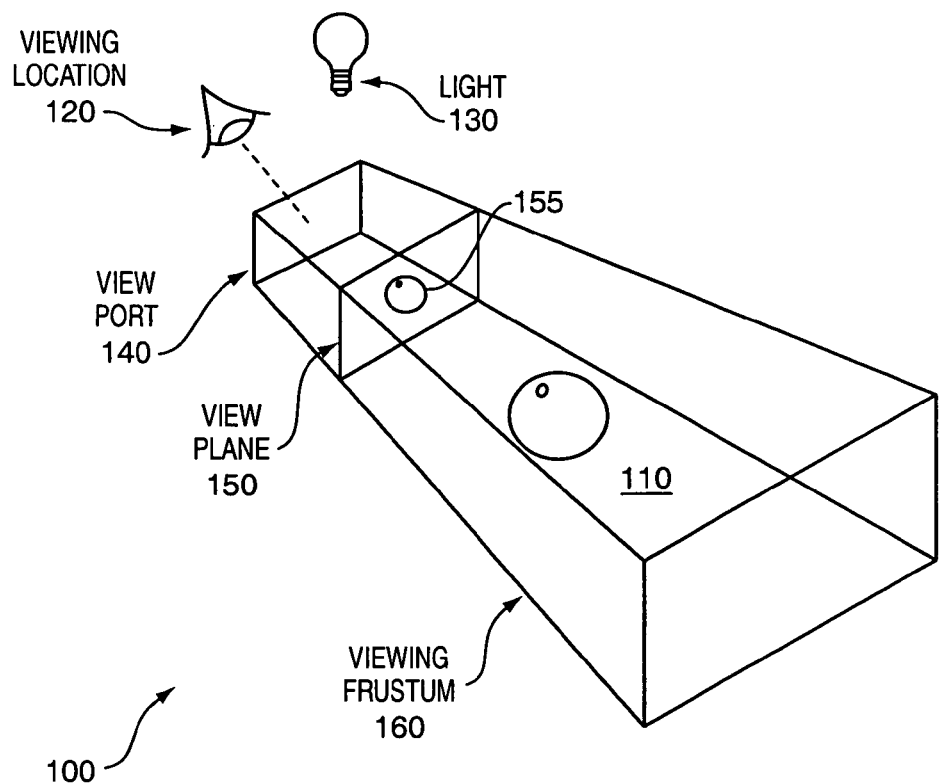
FIG. 1 conceptually illustrates a prior art stage used in three-dimensional computer graphics, according to one embodiment.
Figure 2:
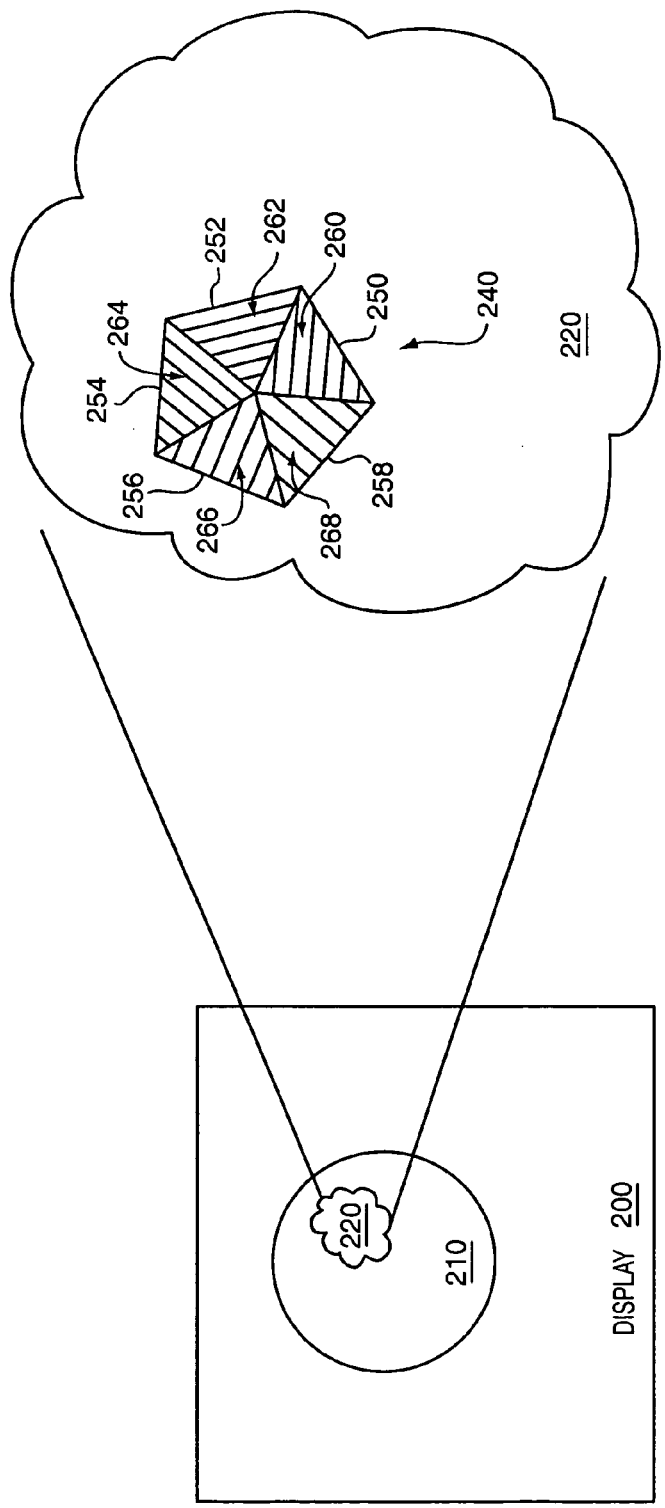
FIG. 2 conceptually illustrates a prior art approach for representing a spherical object with a triangular mesh.
Figure 3:
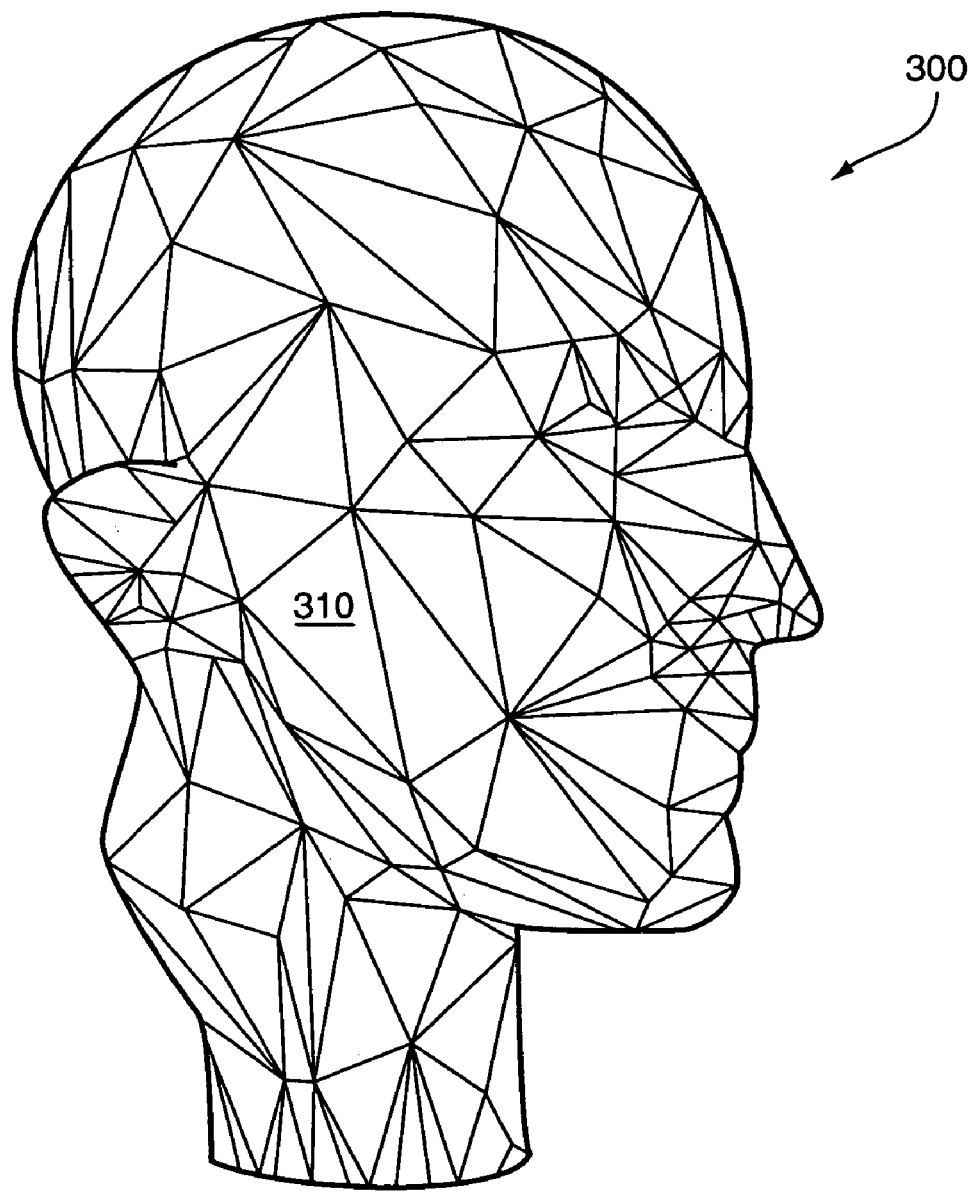
FIG. 3 conceptually illustrates the inadequacy of the triangular mesh representation to represent the smooth surfaces of a human head and face.

The view volume may have any shape that is relevant and practical for the implementation. Often the view volume is related to a viewing location and has a shape that is associated with the viewing location. For example, as shown in FIG. 1, the viewing frustum 160 is related to the viewing location 120. Often the view volume will be a three-dimensional parallelepiped or rectangular parallelepiped, however other view volumes, such as rectangular solids, cubes, cones, spheres, and other shapes are contemplated. Typically, it will be convenient to use view volumes having extents or three-dimensional perimeters that are easily determined and compared to the spatial patches.

Rather than comparing the spatial patch itself to the view volume, which of course is possible, a bounding solid or substantially best-fit bounding solid that contains the entire spatial patch may be generated and used to facilitate comparison to the view volume and make such comparisons more computationally efficient. Simple solids like boxes and spheres are usually desired. Also, best-fit bounding solids are preferred over those that are much larger than they need to be in order to fully contain the spatial patch. The bounding solid may be dimensioned based on the coordinate data and/or displacement data from the spatial patch.

Figure 9:
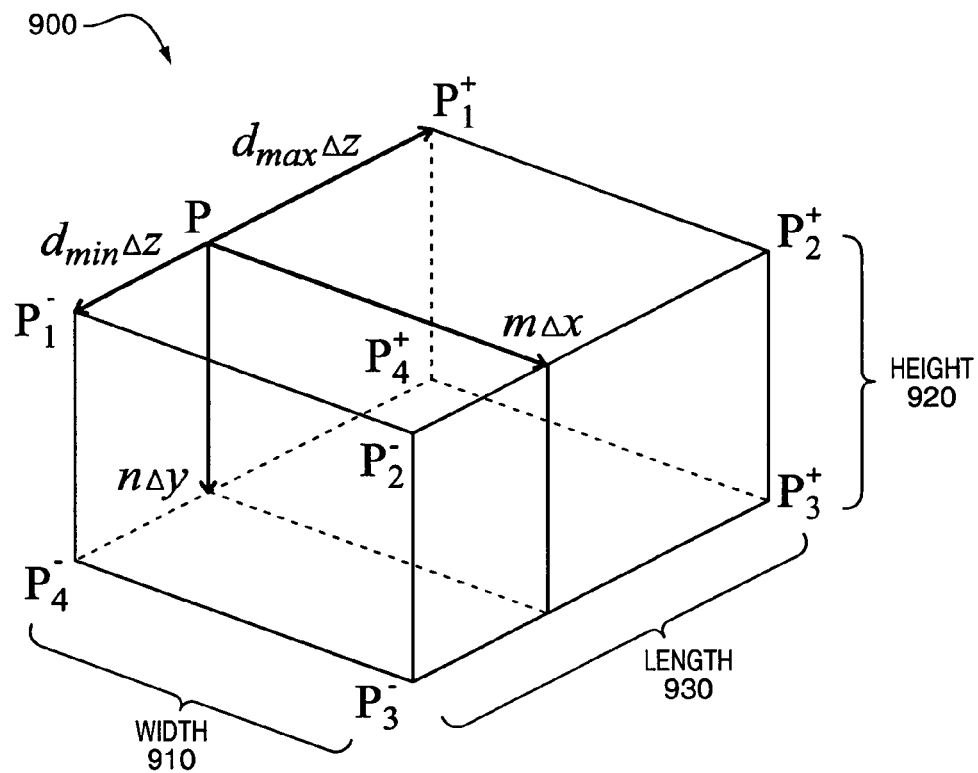
FIG. 9 conceptually illustrates use of a bounding box in visibility processing, according to one embodiment.

FIG. 9 shows that according to one embodiment a bounding box 900 may be used to represent the spatial patch in visibility processing. In this particular case, the bounding box 900 has a width based on a length of the spatial patch in the x-direction (i.e., width is number of nodes in the x-direction (m) multiplied by the distance between nodes in the x-direction ($\Delta x$)). Likewise a height 920 of the bounding box 900 is based on a length of the spatial patch in the y-direction (i.e., $n\Delta y$), and a length 930 of the bounding box 900 is based on a distance along the z-axis between a minimum displacement ($d_{min}\Delta z$, where $d_{min}=\min d_{i,j}$) and a maximum displacement ($d_{max}\Delta z$, where $d_{max}=\max d_{i,j}$). As shown, the bounding box 900 is aligned with the coordinate system of the spatial patch. Displacement extremes can be determined on the fly as well as be pre-computed during modeling (acquisition) and stored with the other data.

Alternatively, a bounding sphere with a center and a radius may be used in visibility processing. The bounding sphere may reduce the number of computations, but is generally only useful in world coordinates, since perspective transformation deforms the spherical shape.

A determination is made at decision block 920 whether the spatial patch is not visible 922, partially visible 926, or visible 930. As stated above, the determination may involve comparing the bounding solid with the view volume. If the spatial patch is not visible 922 (e.g., bounding solid lies outside viewing volume) the spatial patch may be discarded 924. Advantageously, in this way, unnecessary calculation on spatial patches that do not appear in an intended computer graphic may be avoided. If the spatial patch is visible 930, it will be further processed at block 935. Alternatively, if the spatial patch is partially but not completely visible 926, a portion of the spatial patch is removed 928, as will be described next. An additional advantage of visibility processing is assurance that all coordinates lie within the range specified by a view volume and therefore, can be efficiently represented in a fixed-point format, if desired.

Clipping And Scissoring

The method 800 advances from decision 826 to block 828 where processing is performed to remove a portion of the spatial patch. Typically, this processing is performed in world coordinates before projection onto a two-dimensional device plane (assuming a convex-shaped view volume). Although processing is discussed for removing a portion of a spatial patch, removing a portion of a bounding solid is also contemplated.

Removing may be done by a number of techniques including clipping, scissoring, and similar techniques. Clipping is cutting off or removing objects or the outer portions thereof that are not visible in a computer graphics presentation (e.g., not visible on a screen of a display device). Thus, clipping very quickly eliminates outside portions of the spatial patch that does not appear in the image.

Scissoring includes processing portions of spatial patches that lie outside the view volume as usual until rasterization where only pixels inside the viewport window are written to the frame buffer. Thus, scissoring introduces inefficiencies due to wasted processing of the unused portions of the spatial patches, but offers other advantages for complex primitives that are expensive to clip.

According to one embodiment, recursive subdivision may be used. Clipping may be performed according to a recursive procedure that divides a spatial patch base rectangle into two equal halves at each step. The two sub-spatial patches resulting from x-division are characterized as follows:

$P$, $(\Delta x, \Delta y, \Delta z)$, $(c,d)_{i,j}$, $i=1 \ldots m/2$, $j=1 \ldots n$;

$P+\Delta x \cdot m/2$, $(\Delta x, \Delta y, \Delta z)$, $(c,d)_{i,j}$, $i=m/2 \ldots m$, $j=1 \ldots n$.

The notation $(c,d)_{i,j}$ is used to denote the color and displacement data for a node. The remainder of the division of m by two may be discarded. Division in the other direction (y-division) may be performed similarly. The side with the greater number of nodes is typically selected for division at each step.

The sub-spatial patches may be tested for visibility in a similar manner. However, their bounding boxes have no more than twelve new vertices, while the others (sixteen in total) can be taken from the parent geometry. That happens because $d_{min}$ and $d_{max}$ are reached in at least one of the halves.

When and if the recursion comes to an individual cell (e.g., a cell having m and n equal to 1), division may continue by creating dummy internal nodes. This may also be the case during cell rendering, which will be further discussed elsewhere in the detailed description.

Since clipping and scissoring are relatively computationally expensive operations, it will often be advantageous to reduce the number of times these operations are performed. Using spatial patches that are relatively small compared to the view volume are preferred, so that clipping or scissoring is only used on a small percentage of spatial patches.

Figure 10:
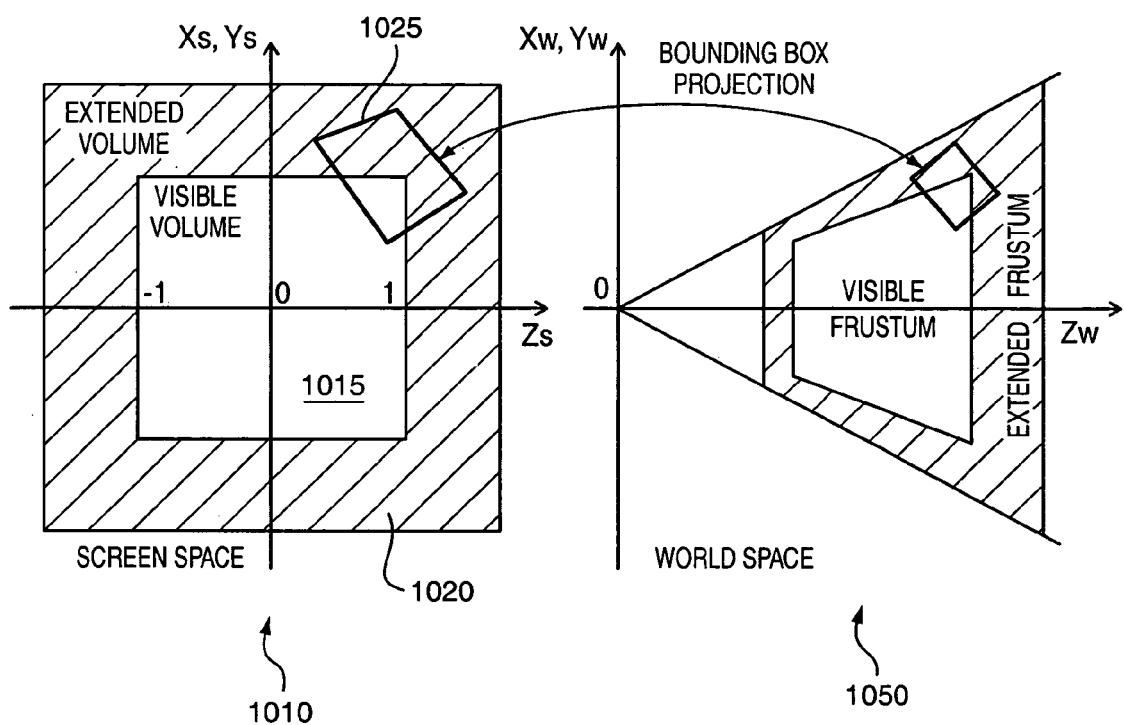
FIG. 10 conceptually illustrates view volume extensions, according to one embodiment.

FIG. 10 shows another approach based on extended view volumes that may be used in certain embodiments. Allowing typically a small percentage (e.g., 5–10%) of a spatial patch to extend outside of the view volume may be used to reduce clipping and increase efficiency. An extended view volume 1020 may be used for this purpose. A view in screen space 1010 and a view in world space 1050 are shown. The view in screen space 1010 includes a visible or view volume 1015, the extended visible or view volume 1020 (shown as gray-scale) and a spatial patch or bounding solid 1025. As shown, the bounding solid 1025 is partly inside and partly outside the view volume 1015. However, the part of the bounding solid 1025 outside the view volume 1015 is inside the extended view volume 1020. As long as this is the case, clipping may not be performed. Accordingly, in one embodiment, an extension of the view volume, such as extension 1020, may modify view volume processing. The modification is conceptually illustrated in the following pseudocode:

if(all extents of bounding solid ∈ extension of view volume) Render( ); else if(all extents of bounding solid ∉ extension of view volume) Discard( ); else Clip( );

The determination above can be performed in either the world 1050 or screen coordinates 1010. The latter case implies perspective projection of eight vertices, however, their screen coordinates are used for further processing. In addition, the vertex inside/outside test in screen space is much more economical since the corresponding volumes are axis-oriented boxes. None of the spatial patches will be clipped if the bounding boxes 1025 for the spatial patches are smaller than the extension of the view volume 1020. This is very likely assuming the spatial patches are small.

Setting Parameters And Initializing

The method 800 advances from either block 820 or block 828 to block 835 where rendering parameters are set and initialization for subsequent rendering is performed. The rendering parameters may qualify and activate the type of spatial patch processing (subsequent rendering) that is to be performed. For example, setting the rendering parameters may indicate that node traversal is to be performed row-by-row within a spatial patch, rather than recursive traversal. Setting the rendering parameters may also include prioritizing between speed and quality. The characteristics of the spatial patch, such as size, density, displacement variations, and others may also impact the rendering parameters. For example, if quality is very important, techniques that compromise perspective correctness may not be preferred, and this may also depend on the size of the spatial patch, since it becomes a bigger issue when large spatial patches are considered. Thus, setting rendering parameters may be used to qualify how a spatial patch is to be rendered, which may assist a processor in performing subsequent rendering operations.

Initialization typically involves performing calculations prior to execution that are consistent with the setting of the rendering parameters. Typically, this involves calculating spatial patch parameters used by rendering algorithms and procedures. For example, initialization may include calculating node deltas (e.g., $\Delta x$, $\Delta y$, $\Delta z$), bounding solids (if not already available), and performing other calculations. Often, the initializations may be performed once per spatial patch. Thus, in some ways, the initialization is similar to the triangle setup stage used in rendering triangular mesh representations. However, typically spatial patches comprise more geometrical data than triangles and the initialization for spatial patches is performed with fewer arithmetic operations in percentage of the total number.

Determining Rendering Mode

The method 800 advances to block 840, where according to one embodiment a mode determination may be made regarding further rendering processing of the spatial patch. In the exemplary determination, block 840 results in a fast determination 842 or a regular determination 848. Typically, the fast determination 842 is made upon a finding that the spatial patch may be rendered in an improved or optimized way (e.g., faster or more efficiently). Determining may involve examining the spatial patch for characteristics or attributes, performing calculations using the spatial patch data, obtaining input from a user, or performing other processing that may be used to associate one spatial patch with fast determination 842 and another spatial patch with regular determination 848.

Processing according to block 844 will be discussed following a detailed discussion of rendering processing following regular determination 848. In the context of this discussion, specific exemplary examples of the determination processing of block 840 will be presented, in order to better illustrate the generality of the approach.

The method 800 shows block 835 occurring before block 840, although other embodiments are contemplated. In one embodiment that may be favorable, depending on the type of mode determination, the setting of rendering parameters and initialization of block 835 may be performed after mode determination. This may be advantageous if the rendering parameters or initialization is different for optimized rendering.

Projecting Coordinates

The method 800 advances from decision 848 to block 855, where the spatial patch (or portions thereof) is projected to a two-dimensional device plane (block 850 shows the transition between FIGS. 8A and 8B). Typically, this involves projecting displaced nodes to device coordinate such as screen coordinates of a display device. For example, considering a spatial patch with an intrinsic topology, the node may have a location given in terms of the origin P, which may be indicated by the coordinate data, plus an index i times a distance between nodes in an x-direction ($\Delta x$) plus an index j times a distance between nodes in a y-direction ($\Delta y$). Then, the displaced mode may be determined by combining the node location with the displacement in the z-direction. The displaced node location may then be projected to the screen coordinates. Row-by-row and recursive approaches are discussed below, although other approaches are contemplated. As will be apparent, displaced nodes may be projected individually or in groups. In the case of projecting groups, matrix and vector operations are often utilized. The result of such projections is the geometric positions of the displaced nodes of the spatial patch in screen space.

Traversing Nodes Row-By-Row

According to one embodiment, nodes may be traversed in a row-by-row manner. The nodes may be displaced and projective transformation may be applied to each displaced node. Such a traversal may be implemented in a number of ways. Without loss of generality to other approaches, a specific approach I discussed below. Pseudocode conceptually representing this approach is as follows:

for($j=1$, $B_{1,1}=P$; $j<=n$; $B_{1,j+1}=B_{1,j}+\Delta y$, $j++$)

for($i=1$; $i<=m$; $B_{i+1,j}=B_{i,j}\Delta x$, $i++$){

$N_{i,j}=B_{i,j}+d_{i,j}\Delta z$;

$N^S_{i,j}=$ProjectToScreen($N_{i,j}$);

Draw($N^S_{i,j}$);

}

In the pseudocode, often perspective projection is the most expensive operation, which implies multiplication by a matrix and division performed for each displaced node. If the spatial patch is sufficiently small compared to the view volume, to a good approximation the nonlinearity of the perspective transformation within a spatial patches' bounding box may be ignored. This may allow displaced node coordinates to be evaluated directly in screen space.

Figure 11:
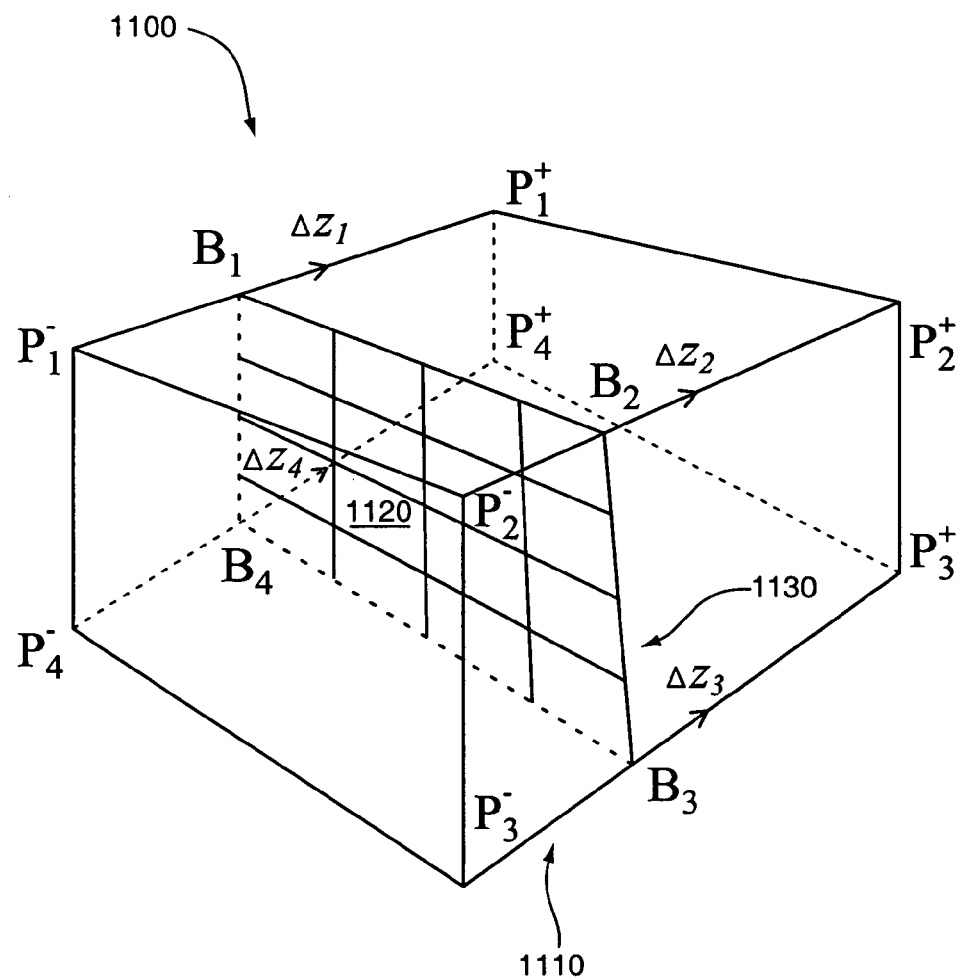
FIG. 11 conceptually illustrates a bounding box and base quadrilateral in screen space, according to one embodiment.

FIG. 11 shows projection into the screen space of a bounding box 1100 containing a spatial patch 1110. A base quadrilateral 1130, which defines a plane 1120 for base nodes, is a planar polygon with four sides and is represented by points $B_k$, $k=1\ldots 4$. This quadrilateral is determined by projection of the bounding box using the following formula:

$$\frac{P_k^+ - B_k}{B_k - P_k^-} = \frac{d_{max}}{d_{min}}, k = 1 \ldots 4,$$

where $P_k^+$ and $P_k^-$ denote vertices after projection of upper and lower planes of the bounding box 1100 in screen space, respectively. The undisplaced nodes may be interpolated bilinearly within the base quadrilateral 1130. The displacement vector also varies bilinearly from node to node, thus the four base vectors are defined in $B_k$ as:

$$\Delta z_k = \frac{P_k^+ - B_k}{d_{max}}, k = 1 \ldots 4.$$

An algorithm that traverses the nodes of the spatial patch 1110 in screen space may determine the node and displacement vector for each one, and perform the displacement. Since both the node and the displacement vector may be interpolated bilinearly, their coordinate triples may be treated similarly. Therefore, they may be considered as one six-tuple for arithmetic operations. This "super-vector" will be donated as $S_k = \{B_k, \Delta z_k\}$. The following pseudocode conceptually represents the node traversal algorithm, which in this case is based on a forward-difference approach:

$\Delta y = (S_4 - S_1)/n;$ $\Delta x = (S_2 - S_1)/m; \Delta x' = (S_3 - S_4)/m;$ $\Delta xy = (\Delta x' - \Delta x)/n;$ for$(j=1, S_{1,1}=S_1; j<=n; S_{1,j+1}=S_{1,j}+\Delta y, \Delta x+=\Delta xy, j++)$ for$(i=1; i<=m; S_{i+1,j}=S_{i,j}+\Delta x, i++)\{$ $N^S_{i,j} = S_{i,j,B+di,j} \cdot S_{i,j} \cdot \Delta z;$ Draw$(N^S_{i,j});$ $\}$ The pseudocode above includes an extra addition, which is indicated in bold, compared to row-by-row traversal in world coordinates. It also assumes all arithmetic operations are executed on six-tuples instead of triples, which may be not so important in case of parallel computations. Advantageously, this approach does not include per-node projection and division by the homogenous w coordinate. The price to pay for this added efficiency is minor loss perspective correctness within a spatial patch, which is usually imperceptible.

Alternatively, instead of using projection of a bounding box, base quadrilaterals could be obtained by projecting the spatial patch origin P and three deduced points, namely, $P+m\Delta x$, $P+n\Delta y$, and $P+m\Delta x+n\Delta y$. However, often this will not be as good an approach, since the displacement vector would depend not only on a undisplaced node, but also on a displacement value to ensure that the produced node lies within a bounding box. In contrast, the previous approach should not generate outside the projection of the bounding box because it is a trilinear interpolation between upper $P_k^+$ and lower $P_k^-$ planes.

Traversing Nodes Recursively

Alternatively, according to another embodiment, traversal of the spatial patch 925 may be done recursively. The row-by-row traversal techniques discussed elsewhere in the detailed description typically project all displaced nodes. In some cases, such as when multiple nodes correspond to the same pixel, this may not need to be done. Thus, avoiding performing these unneeded operations can improve efficiency. However, the recursive traversal approach presented in this section is also more complex to implement than the other approaches discussed, and may become beneficial when about four displaced nodes correspond to a single pixel.

Figure 12:
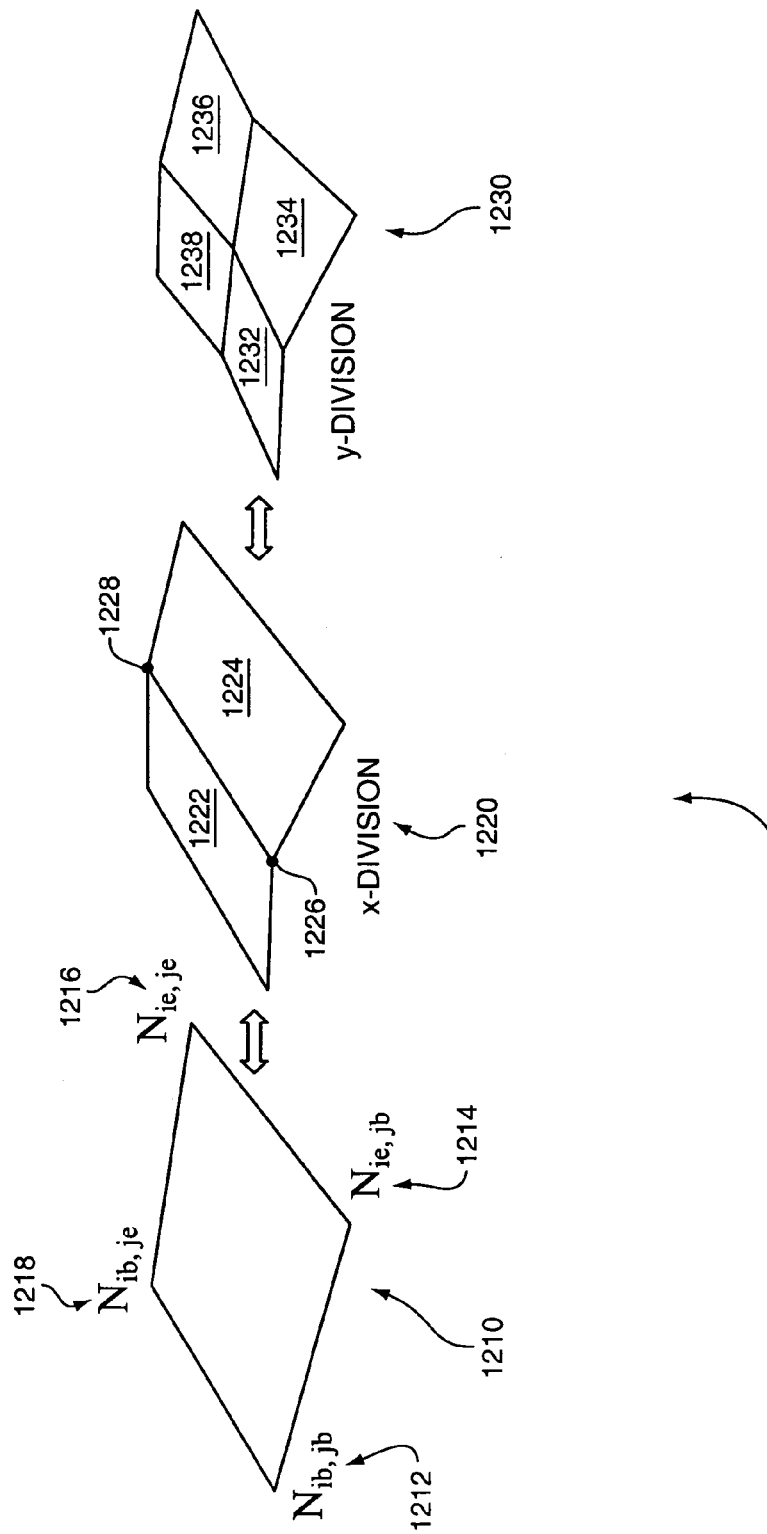
FIG. 12 conceptually illustrates an embodiment of recursion.

FIG. 12 conceptually illustrates the recursive approach, according to one embodiment. As recursive progression 1200 is shown. The recursive approach begins with a quadrilateral 1210 defined by the four corner nodes $Ni_b,j_b$ 1212, $Ni_e,j_b$ 1214, $Ni_e,j_e$ 1216, and $Ni_b,j_e$ 1218. A first recursion along the x-direction created a quadrilateral pair including a first quadrilateral 1222 and a second quadrilateral 1224 by creating two inner nodes 1226 and 1228. Typically recursion will be performed along the longest side of quadrilateral 1210 and typically the inner nodes will be created at or near the midpoint of a side. Thus, recursion essentially created sub quadrilaterals 1222 and 1224 that may be processed similarly to quadrilateral 1210. As shown, a second recursion along the y-direction is applied to quadrilaterals 1222 and 1224 to create four quadrilaterals 1230 including a first quadrilateral 1232, a second quadrilateral 1234, a third quadrilateral 1236, and a fourth quadrilateral 1238. The four quadrilaterals 1230 may be processed similarly and recursively, as desired. Typically, recursion may be stopped following a determination that no new pixel would be affected by further recursion. There are a variety of ways to make such a determination, including those that use bounding solids.

Conceptually, the recursive approach is represented in the following pseudocode:

Traverse(ib,ie,jb,je){ if(Interior($N_{ib,jb}, N_{ie,jb}, N_{ie,je}, N_{ib,je}$)=Ø) break;

if(direction=='x'){

$i=(ib+ie)/2$; Draw($N_{i,jb}$); Draw($N_{i,je}$);

Traverse(ib,i,jb,je);

Traverse(i,ie,jb,je);

} else {//Similarly for y-division}

} where ib,ie,jb,je identify a quadrilateral 1210 in the base plane, as shown in FIG. 12. The root call for this recursion is Traverse(1,m,1,n). The interior test determines whether the projection of the current quadrilateral has no internal pixels, which have not been drawn yet. The test may determine whether the further execution of the recursion produces pixels other than those already drawn. The projection of the quadrilateral may depend on how its interior is filled (e.g. two triangles, bilinear, using given displacements, etc.). So the algorithm may operate with projections of vertices, normals in vertices, and possibly additional data. As will be discussed below for cell rendering, various tests are contemplated. If the test answers in the negative, then the direction for subdivision is selected, usually, by determining the longest side of the quadrilateral.

The test to determine when to stop recursion based on the respective quadrilateral works best if each spatial patch approximates a nearly smooth surface fragment. Otherwise, the projection of internal nodes may extend to outer pixels even in the case where corners lie within one pixel. When this becomes an issue, as desired, bounding solids or boxes may be used rather than quadrilaterals. These bounding solids have been discussed above, such as for clipping. Often, this will not be needed for many intended applications.

Often the inner node is evaluated twice. This should not introduce cracks, since the same procedure is used. Also, further processing may be used to deal with this issue, as will be discussed elsewhere in the detailed description.

As discussed elsewhere, in cases where indexes such as (i,j) may be used to identify coordinates within the base plane, the appearance map may be likened to a texture map, with a $(c,d)_{i,j}$ texture array attached to the spatial patch. Accordingly, approaches like multi-resolution filtering, mip mapping, and other approaches may be applied to appearance data as well as displacement data of a spatial patch. This may be advantageous if significant minification of a scene is expected or a single pixel on the screen corresponds to multiple texels.

Determining Pixel Color

The method 800 advances from block 835 to block 840, where pixel color is determined. Typically color determination occurs after a geometrical position of each node on a screen is determined. Typically, color determination includes evaluating computer graphics models and/or calculations to determine how to modify a pixel color value specified by an appearance map of a spatial patch. The result of color determination will be a set of graphics data in a memory, such as a set of finally colored pixel data in a frame buffer.

Those having an ordinary level of skill in the art will appreciate that spatial patches are compatible with other computer graphics techniques and any of these techniques may be used during color determination. For example, spatial patches may be used in conjunction with various shading models, illumination models, transparencies, inter-object reflections, physically-based models, ray tracing, recursive ray tracing, radiosity calculations, caustics, particle systems, fractal models, physically-based modeling, animation, and other computer graphics techniques. For purposes of illustration, and without loss of generality to these other approaches, further discussion will be provided below on shading calculations.

Different shading algorithms are contemplated, including Gouraud shading and Phong shading. Gouraud shading is a relatively simple shading method that computes the surface characteristics based on color and illumination at certain points. In the case of triangles, color values for the surface of the triangle are computed using color and illumination at the triangle vertices. Surface normals or normal vectors at the vertices are used to compute RGB values that may be averaged to fill in the triangles surface. In the case of spatial patches, Gouraud shading includes lighting the nodes and interpolating final colors within a cell or four adjacent projected displaced nodes in screen coordinates.

Phong shading provides more realistic surfaces than Gouraud shading, but also is more computationally demanding. Phong shading includes computing a shaded surface based on the color and illumination at each pixel. Phong shading may be implemented for a spatial patch by calculating or interpolating normal vectors within a cell and lighting each pixel separately. In this way, a more realistic RGB value may be obtained for each pixel.

Thus, in both approaches, a normal vector is needed for a node $N_{ij}$. In cases where the spatial patch is considered to be a regular quadrilateral mesh, the straightforward choice for normal $n_{ij}$ computation would be the normalized vector product of two approximated tangents in world coordinates, as follows:

$$Tx_{i,j}=N_{i+1,j}-N_{i-1,j}, Ty_{i,j}=N_{i,j+1}-N_{i,j-1},$$

$$n_{i,j}=(Tx_{i,j} \times Ty_{i,j})/|Tx_{i,j} \times Ty_{i,j}|.$$

This approach computes the vector product with floating-point computation and further normalization for every node, which may be expensive operations. On the other hand, this approach can be efficiently applied with bump-mapping.

Alternatively, normal vector computation can be performed in local spatial patch space, to a fair approximation that is often sufficient. Since shading may be efficiently performed in orthonormal space, the spatial patch frame vectors Δx, Δy, and Δz are normalized by dividing each of them by their respective length in world coordinates. Displacement variations for each spatial patch node are given as:

$$d_{i,j}^x=d_{i+1,j}-d_{i-1,j}, d_{i,j}^y=d_{i,j+1}-d_{i,j-1}$$

An approximation to tangent vectors in the introduced orthonormal coordinate system is:

$$Tx_{i,j}=(|\Delta x|,0,d_{i,j}^x|\Delta z|)^T, Ty_{i,j}=(0,|\Delta y|, d_{i,j}^y|\Delta z|)^T.$$

The standard formula of vector product yields:

$$|\Delta x||\Delta y|(Tx_{i,j} \times Ty_{i,j}) = \left(-d_{i,j}^x \frac{|\Delta z|}{|\Delta x|}, -d_{i,j}^y \frac{|\Delta z|}{|\Delta y|}, 1\right)^T.$$

The normal vector $n_{i,j}$ is obtained by normalization of the right part of the equation above. As ⊕Δz/|Δx| and |Δz|/|Δy| ratios can be pre-computed for each spatial patch, the vector product may be computed with only two multiplications.

Often, Δx, Δy, and Δz are comparable in magnitude and their ratios are nearly one. This may allow representing numbers in a fixed-point format. However, normalization may include performing division, which is usually not suitable for fixed-point computations. However, if all variables are within the specified range, division may usually be implemented without floating-point arithmetic involved.

For node shading, light sources may also be defined in local orthonormal coordinates and may be produced from the world coordinates once per spatial patch through multiplication by the matrix, which is naturally defined by (Δx,Δy,Δz) vectors.

Frequently, when displacements are represented by 8-bit values, many nodes may have identical normal vectors. The fact that all spatial patches of a model are likely to have similar or equal |Δz|/|Δx| and |Δz|/|Δy| ratios increases the likelihood that each normal will be computed multiple times. Thus, according to one embodiment, computed normals may be buffered in order to improve performance by eliminating expensive normalizations.

From the vector product formula in spatial patch coordinates, it is apparent that the normal vector for a node depends on displacement variations through $d_{i,j}^x$ and $d_{i,j}^y$.

Thus, given the spatial patch configuration (|Δz|/|Δz| and |Δz|/|Δy|normals can be stored, such as in a two-dimensional table with cells addressed by the ($d^x_{i,j}$, $d^y_{i,j}$) pairs. Generally, high accuracy is not needed to represent the normals. In one case, 8 bytes may be used for each cell, including 2 bytes for each of three coordinates and 2 bytes for spatial patch configuration to validate the normal stored in a cell.

An exemplary table for 8-bit displacements may have 512×512 cells and consume 2 Megabytes. Internal symmetries may be exploited to reduce the total amount of memory. In the case of just one quadrant, 512 Kilobytes (Kb) of allocation may be sufficient. If, in addition, the two ratios for a spatial patch are equal, then the quadrant can be cut in half resulting in 256 Kb. Exploiting symmetries may offer other advantages, such as increasing the probability of hitting the same cell several times.

In some cases, spatial patches may have different configurations. In such cases, often normals for one configuration will not be used for the other configuration. However, if the difference is small, normal reuse may not leads to visual degradation. Thus, having defined maximal possible deviation, spatial patches may be ordered in a scene so that spatial patches of the same or similar configuration are stored in one sequence. In this way, the number of actually restored normal vectors may be significantly reduced. This may be done in a pre-processing stage or elsewhere. Other memory management approaches are also contemplated.

Thus, a brief discussion of color determination has been provided, including a discussion of Gouraud and Phong shading models and strategies for efficient determination of normal vectors for spatial patches. As discussed above, use of other computer graphics techniques with spatial patches is contemplated. Many of the issued discussed above are also relevant to other computer graphics techniques used in color determination, such as ray tracing. For example, in the case of ray tracing, the normal vector approach may be applied, as well as the use of bounding solids as part of a ray/spatial patch intersection algorithm. The ray-spatial patch intersection procedure may be optimized for a spatial patches' regular structure. Space and model partitioning techniques may also be applied since spatial patches may be small and independent in terms of the whole scene.

Interpolating And Rendering Quadralaterals

The method 800 advances from block 860 to block 865, where interpolation may be performed, according to one embodiment. Typically, interpolation will be used to calculate values for missing pixels or gaps in a memory that may occur due to effects such as magnification. Often, the values will typically be stored in a memory, such as the frame buffer or z-buffer, with the other pixel values.

Figure 13:
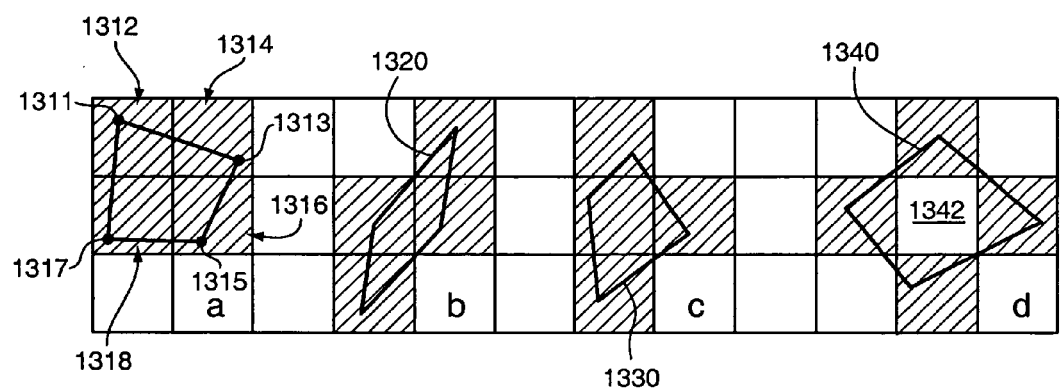
FIG. 13 conceptually illustrates quadrilateral rendering on quadrilaterals having an not having an inner pixel, according to one embodiment.

FIG. 13 conceptually illustrates that interpolation may be associated with quadrilateral rendering according to one embodiment. FIG. 13 shows a first quadrilateral 1310, a second quadrilateral 1320, a third quadrilateral 1330, and a fourth quadrilateral 1340 in grid 1350. The quadrilaterals may be formed from four adjacent displaced nodes in a spatial patch. The grid 1350 may be a frame buffer, a z-buffer, or other memory location associated with a display screen. Each of the shown squares of the grid may be associated with a pixel. The first quadrilateral 1310 has a first corner 1311 associated with a first square 1312 of the grid, and likewise, a second 1313, third 1315, and fourth 1317 corner associated with a second 1314, third 1315, and fourth square 1316. Often, since the first corner 1311 is contained within the first square 1312, a pixel associated with the first square 1312 will be attributed properties associated with the first corner 1311 or a corresponding node in a spatial patch. As shown, the first 1312, second 1314, third 1316, and fourth 1318 squares are adjoining and there are no interior squares. The second 1320 and third 1330 quadrilaterals have similar characteristics, although they have different positions within the grid 1350 and different shapes.

The fourth quadrilateral 1340 has a noteworthy different characteristic, namely an interior square 1342 (shown as not shaded) of the grid 1350 that does not contain a corner of the fourth quadrilateral. That is, all four corners of the quadrilateral lie in squares of the grid that enclose the interior square 1342. Gaps such as the interior square 1342 may occur due to effects such as magnification. Accordingly, appearance data may often not be available for interior square 1342. Interpolation may be used to obtain such appearance data for interior square 1342. interpolation may be performed by rendering a cell containing an interior square, missing pixel, or gap.

Typically, before interpolation begins, a simple test is used to determine whether an interior pixel exists. Often, a simple test based on simple length or distance computations will be sufficient. Two approaches are discussed below, including one that operates with pixel indices (rounded screen coordinates) and another that uses true screen coordinates (e.g. represented in floating- or fixed-point format).

Given an arbitrary quadrilateral ($N_{i,j}$, $N_{i+1,j}$, $N_{i+1,j+1}$, $N_{i,j+1}$), the interior test is to determine if there exist pixels to be set in addition to those containing the nodes themselves. Let $p_{i,j}=(xy)_{i,j}$ denote pixel integer coordinates of the node $N_{i,j}$. Considering the eight-connected distances between pixels, the lengths of four quadrilateral sides may be calculated as follows:

$$l_0 = \max(|p_{i,j}.x - p_{i+1,j}.x|, |p_{i,j}.y - p_{i+1,j}.y|),$$

Likewise, $l_1$, $l_2$, and $l_3$ may be calculated similarly. The quadrilateral appears small if it satisfies the following condition:

$$\max_{k=0\ldots 4}(l_k) \leq 1.$$

Quadrilaterals that have at least one side of zero length do not have unfilled interiors (e.g., interior pixels). Accordingly, this approach can be used to easily distinguish the fourth quadrilateral 1340, since it has both diagonals greater than one inter-pixel distance in the same eight-connected raster metric.

Alternatively, in another approach, the lengths of diagonals of a quadrilateral may be considered in screen space disregarding the z coordinate. If both diagonals are smaller than the size of a pixel, or a square such as square 1312 in the grid 1350, then the determination will be that there are no internal pixels. This approach may be stronger than that based on sides.

If the determination indicates an interior pixel such as interior pixel 1342 interpolation may be performed. Depending on the accuracy desired, various interpolation methods are contemplated. For example, when less accuracy is desired a Gouraud-like approach may be used, which will typically execute faster and involve using less memory resources. Alternatively, when more accuracy is desired, a Phong-based interpolation method, or similar method in which surface normals are interpolated for interior pixels may be used. The actual choice of interpolation method may depend on a number of factors, including the accuracy desired, characteristics of the objects (e.g., heterogeneity), computer and memory resources, and other factors. Without loss of generality, several specific exemplary approaches are discussed, although many alternate approaches are contemplated.

Generating two triangles for every cell yields a piecewise linear surface in terms of interpolation. As human vision system is very sensitive to sharp edges, more smooth interpolation results in more natural looking views. An efficient solution based on subdivision provides an iterative refinement of the geometry (e.g., the spatial patch mesh) up to the desired level of accuracy, provided that further processing converges to a smooth limiting surface. Often this results in an exponential increase in memory and computing requirements for each refinement step, which reduces their compatibility with hardware accelerated rendering.

Given a spatial patch cell ($N_{i,j}$, $N_{i+1,j}$, $N_{i+1,j+1}$, $N_{i,j+1}$), which may be an arbitrary quadrilateral in either world or screen space, a bilinear interpolation may usually be simply performed. This approach converges to a surface that is essentially infinitely differentiable inside the cells, and continuous at edges since edge points lie on straight segments connecting the corresponding vertices.

Bilinear interpolation has the convenient property of four-point support, which means that data outside a cell or quadrilateral is usually not needed for the interpolation. According to one embodiment, this property may allow cell interpolation to be implemented in a logically separate stage, such as in a rendering pipeline. The following pseudocode conceptually illustrates the approach for a quadrilateral with an arbitrary shape:

Subdivide($N_1,N_2,N_3,N_4$){ if(Stop Test($N_1,N_2,N_3,N_4$)) break;

if(direction=='x'){

$N_5=(N_1+N_2)/2$; Draw ($N_5$);

$N_6=(N_3+N_4)/2$; Draw ($N_6$);

Subdivide($N_1,N_5,N_6,N_4$);

Subdivide($N_1,N_5,N_6,N_4$);

} else {//Analogically for y-division}

}

Often, since the algorithm is recursive, a stack-based memory implementation and/or algorithm may be used. The stack may be managed in a fast on-chip memory or cache provided that the recursion depth is not too large. Additionally, cell interpolation may impose an added memory burden on one or more previous stages, such as stages associated with traversing the spatial patch, projecting to screen coordinate, and/or color determination. Row-by-row traversal may be implemented in registers with no references to memory. However, one row before the one currently traversed may need to be stored, since its nodes define the upper boundaries of the respective cells. These nodes may be managed as a circular array of m+1 elements in memory.

Figure 14:
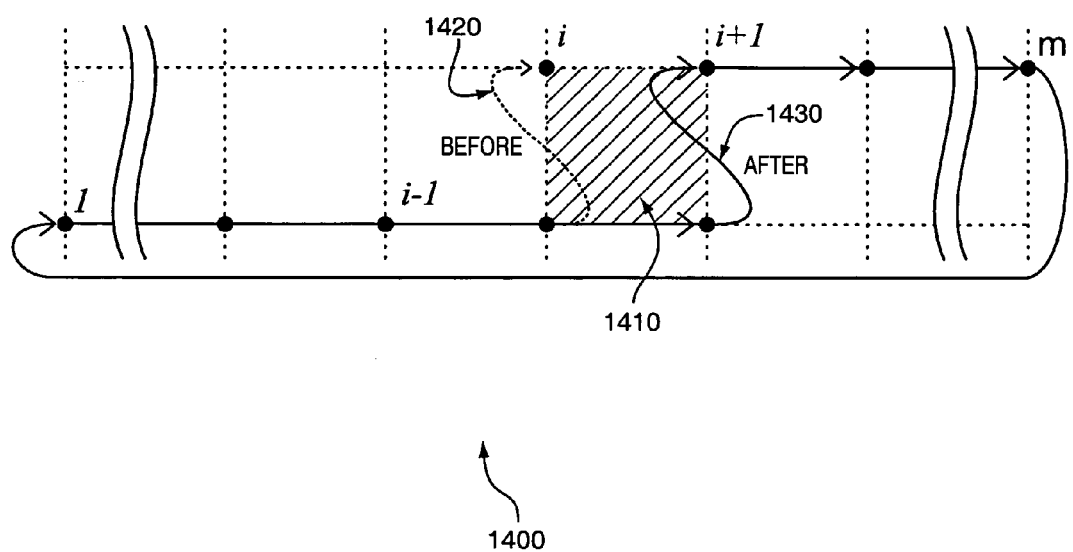
FIG. 14 conceptually illustrates exemplary memory management for rendering spatial patches, according to one embodiment.

FIG. 14 conceptually illustrates the states of an array before and after rendering the cell shaded with gray 1410. A portion 1400 of the circular array is shown including the cell shaded in gray 1410. A state 1420 of the circular array before rendering the cell shaded in gray 1410 is shown as well as a state 1430 of the circulat array after rendering the cell shaded in gray 1410. During rendering of this cell 1410, the circular array contains values for left-bottom, left-top and right-top corners of the cell. The value for the cells right-bottom corner is calculated. This value then replaces the left-top entry in the array. Then it may be used while processing the next row.

If significant magnification of a scene occurs, the discontinuity of the first derivative on cell edges may become noticeable. Interpolatory subdivision of a higher degree may be used to make the whole surface at least $C^1$-continuos. A commonly used four-point scheme may be satisfactory for many implementations. Given a one-dimensional array of nodes $N_1 \ldots N_m$, this scheme generates a refined array $N'_1 \ldots N'_{2m}$ as follows:

$$N'_{2i+1} = \frac{9}{16}(N_i + N_{i+1}) - \frac{1}{16}(N_{i-1} + N_{i+2}), N'_{2i} = N_i,$$

This scheme has cubic precision. A similar process may be applied to the refined array in order to obtain even more accuracy. In general, such subdivisions converge to a smooth limiting curve.

In one straightforward implementation embodiment of the described process, the whole array of nodes generated at each step is stored, which may result in a exponentially-increasing memory consumption. Regarding the advantageous features of the four-point scheme, an algorithm has been developed that may operate on a stack and may serve as an extension to the recursive bilinear interpolation of a quadrilateral. The algorithm has cubic precision and typically results in a smooth surface over spatial patch grid.

Figure 15:
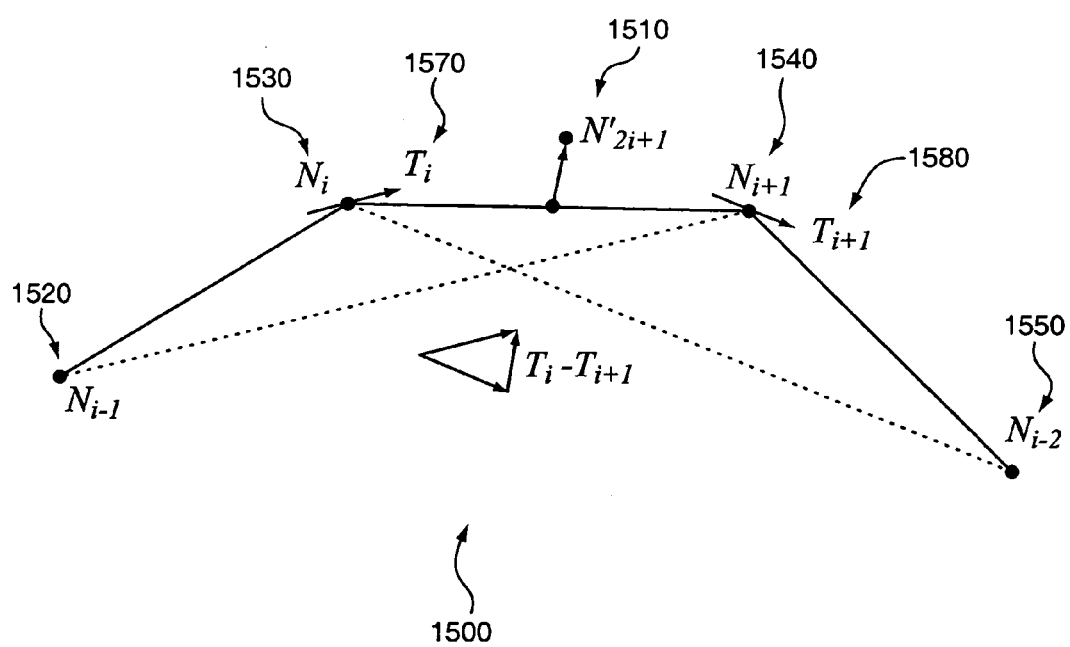
FIG. 15 conceptually illustrates interpolation for an inner node, according to one embodiment.

FIG. 15 conceptually illustrates an approach 1500 for interpolating an inner node, according to one embodiment. The approach 1500 includes interpolating or approximating a value for an inner node 1510 in terms of information available at or determinable for a first node 1520, a second node 1530, a third node 1540, or a fourth node 1550. In particular, inner node 1510 may be evaluated based on an average of the second node 1530 and the third node 1540 adjusted by a difference 1560 between a first 1570 and second approximated tangent vector 1580. The first vector 1570 may be calculated from the first 1520 and third node 1540. Likewise, the second vector 1580 may be calculated from the second 1530 and fourth node 1550. More precisely, the inner node 1510 and first 1570 and second vector 1580 may be determined by the following relationships:

$$N'_{2i+1}=(N_i+N_{i+1})/2+T_i-T_{i+1}, \text{ where}$$

$$T_i=(N_{i+1}-N_{i-1})/16, \text{ and } T_{i+1}=(N_{i+2}-N_i)/16$$

In this particular case, a vector $T_k$, such as the first 1570 and second vector 1580, may be divided by sixteen. Conceptually, the approximation treats the inner node $N'_{2i+1}$ 1510 as lying on a unique cubic curve that interpolates $N_{i-1}$ 30 and $N_{i+1}$ 1580, and has derivatives in these nodes equal to $T_i$ 1570 and $T_{i+1}$ 1580. In a four-point scheme the tangent vectors 1570, 1580 would be evaluated at each step. Instead, they may be attached to the corresponding nodes and considered as constant for further iterations. Since the point's parameterization may dilate at each iteration, tangents 1570 and 1580 may be divided by two on each step so that they remain in compliance with the current grid density.

Figure 16:
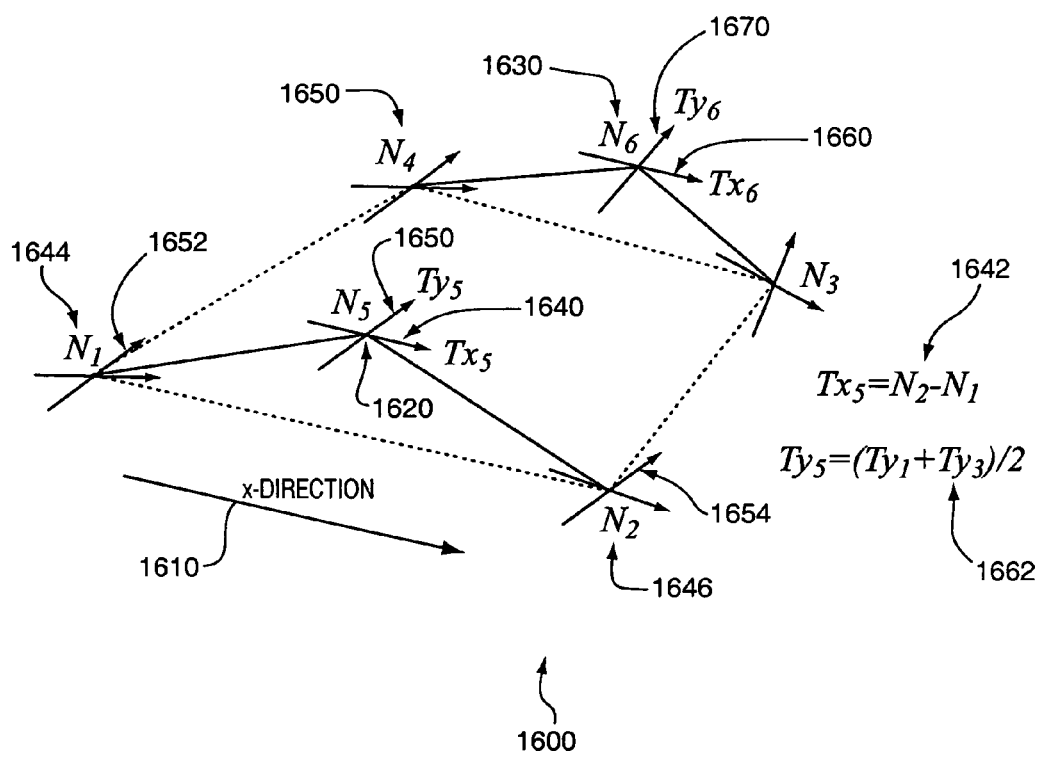
FIG. 16 conceptually illustrates quadrilateral subdivision, according to one embodiment.

FIG. 16 conceptually illustrates an approach 1600 for subdivision in an x-direction, according to one embodiment. The approach 1600 includes subdivision in an x-direction 1610 to create a first subdivided node 1620 and a second subdivided node 1630. For cells of the spatial patches two-dimensional mesh, the algorithm selects the direction for subdivision, such as the x-direction 1610 in this case, and applies the rule producing two new nodes, such as nodes 1620 and 1630, on the corresponding sides. One of the tangents 1640 for the first subdivided node 1620 is computed 1642 from a parent first 1644 and second node 1646. Another tangent 1650 is linearly interpolated 1652 in terms of a tangent 1652 of the parent first node 1644 and a tangent 1654 of the parent second node 1646. A first 1660 and second tangent 1670 of the second subdivided node 1630 may be determined similarly, or by another approach.

A stop criteria will usually be provided to stop execution of the recursion. For spatial patches of small variation, the interior test described for bilinear interpolation may frequently be sufficient. If variations are large, then subdivision may produce shapes of high curvature, and internal points may deviate significantly from a footprint of the base quadrilateral. If more accuracy is desired, approaches that consider not only nodes, but also tangents, may be considered.

Denoting the structure of a node and two tangent vectors with $S_k = \{N_k, Tx_k, Ty_k\}$, the following pseudocode conceptually illustrates the smooth cell interpolation algorithm.

```
Subdivide(S1,S2,S3,S4){ if(StopTest(S1,S2,S3,S4)) break;

if(direction=='x'){

S5.N=(S1.N+S2.N)/2+(S1.Tx−S2.Tx); Draw(S5.N);

S5.Tx=S2.N−S1.N; S5.Ty=(S1.Ty+S2.Ty)/2;

//Calculate S6 analogically

//Make recursive calls

}else {//Analogically for y-division}

}
```

This approach may be implemented on a stack. Such a stack will typically be larger, such as three times larger, than expected for a bilinear interpolation approach. The node traversal stage should buffer three rows of nodes instead of one for the proper evaluation of initial tangents. The computational cost of the proposed approach is six extra additions and two divisions by two. Depending on the intended application, restoring a smooth surface over the whole spatial patch may or may not justify these additional costs.

According to one embodiment, nodes may be restored in world coordinates. Restoration in world coordinate preserves perspective correctness but may often involve per-node transformation. Alternatively, according to another embodiment, the algorithm may be implemented directly in local spatial patch space, where interpolation may be performed on displacements rather than coordinate triples. The algorithm seems to achieve good performance if implemented in screen space with coordinates represented in fixed-point format. Fixed-point numbers may be efficiently used because additions and divisions by 2, which are bitwise shifts in this case, are generally the only arithmetic operations involved.

As the proposed algorithm refines the mesh in an adaptive manner, $C^{-1}$-inconsistencies may occur when faces from different refinement levels meet. One way of dealing with this issue is for the refinement algorithm to proceed until it reaches an accuracy level as high as the pixel grid. Then, since nodes on an edge may be generated by at least similar procedures for both cells sharing this edge, holes comparable in size to a pixel are not expected. Thus, such inconsistencies do not usually affect the computer graphics rendered.

Rendering Triangles

The method 800 advances from block 865 to block 870 where optional triangle rendering may be performed, according to one embodiment. In cases where it is desirable to do so, a spatial patch may be represented as or converted into triangles. This may be done so that further rendering may be performed on a standard graphics pipeline. One way to accomplish this is to convert a quadrilateral either in spatial patch space, world coordinates space, or screen space, into two triangles. Opposing corners of the quadrilateral become connected vertices in a triangle mesh. By way of example, this may be performed on quadrilaterals in the frame buffer or z-buffer. In one case, the quadrilaterals may have inner unfilled pixels and triangle rendering may be performed instead of interpolation. However, this approach may weaken the quality of computer graphics and may create a large number of small triangles that increase computational costs. Accordingly, in many embodiments, triangle rendering may not be performed.

Determining More Spatial Patches To Render

The method 800 advances to block 875 where a determination is made whether more spatial patches are to be accessed and processed. In one embodiment, this decision may be related to or associated with the processing described for accessing a spatial patch at block 805. For example, in the case of accessing spatial patches by traversing an ordered arrangement of spatial patches, this may include determining whether there is another spatial patch in the list. Alternatively, a spatial patch rendering unit, a video game, or other software or hardware may make this determination. For example, in the case of a video game, user input through a data input device may affect the determination. If the determination indicates that another spatial patch is to be accessed 877, then block 805 may be revisited (block 878 shows the transition between FIGS. 8A and 8B). The method 800 may thus loop through blocks 805 through 855 until a determination indicates that no more spatial patches are to be accessed and processed 879.

The method 800 shows interpolation occurring inside of the loop indicated by decision 877 and block 878. This may often be the case, so that parallel processing may be used to perform interpolation independently for a spatial patch. However, in other embodiments, interpolation could be performed outside of the loop. In particular, interpolation may be performed after decision 879 or after block 880. For example, data for a plurality of spatial patches may be presented to a memory location (e.g., a frame buffer) and then interpolation may be performed. Opportunities for parallel processing may not be as good, and determinations to properly select gap pixels may be needed.

Optimizing Rendering

The method 800 advances from determination 842 to block 844 where optimized rendering processing may be performed. This is an optional feature of certain embodiments that may be used to improve rendering performance (e.g., speed, efficiency, etc.) by performing different rendering processing of spatial patches that have specific or predetermined characteristics. Typically, this includes examining the spatial patch and determining whether the spatial patch has the requisite characteristics. Then, rendering may be altered, such as by skipping certain processing that is typically performed on spatial patches, or performing processing in a different way, such as one that is more efficient, faster, or computationally optimized.

In one embodiment, quadrilateral rendering or interpolation may be performed differently. As discussed above, this processing normally occurs after node coordinates have been computed during node traversal. Often, the processing includes determining whether the quadrilaterals have interior or inner pixels to fill. If they do not, no interpolation takes place. Making this determination when there is no inner pixel or small likelihood of an inner pixel is wasteful processing. For example, inner pixels are not likely when there is slight minification. Accordingly, in one case, a determination is made once for a spatial patch and processing a spatial patch differently if the determination indicates either that there are no inner pixels, that there are sufficiently few inner pixels, or that there is a sufficient improbability of inner pixels.

As described above, the test for interpolation (or the stop condition) often includes comparing lengths or diagonals of quadrilaterals with pixels. Rather than making separate determinations, a major length may be determined for a spatial patch and quadrilateral interpolation stage disabled if the majoring length is less then a pixel length. Since node traversal does not need memory to store nodes in this case, the whole rendering process could be implemented separately, such as in a separate rendering stage.

Figure 17:
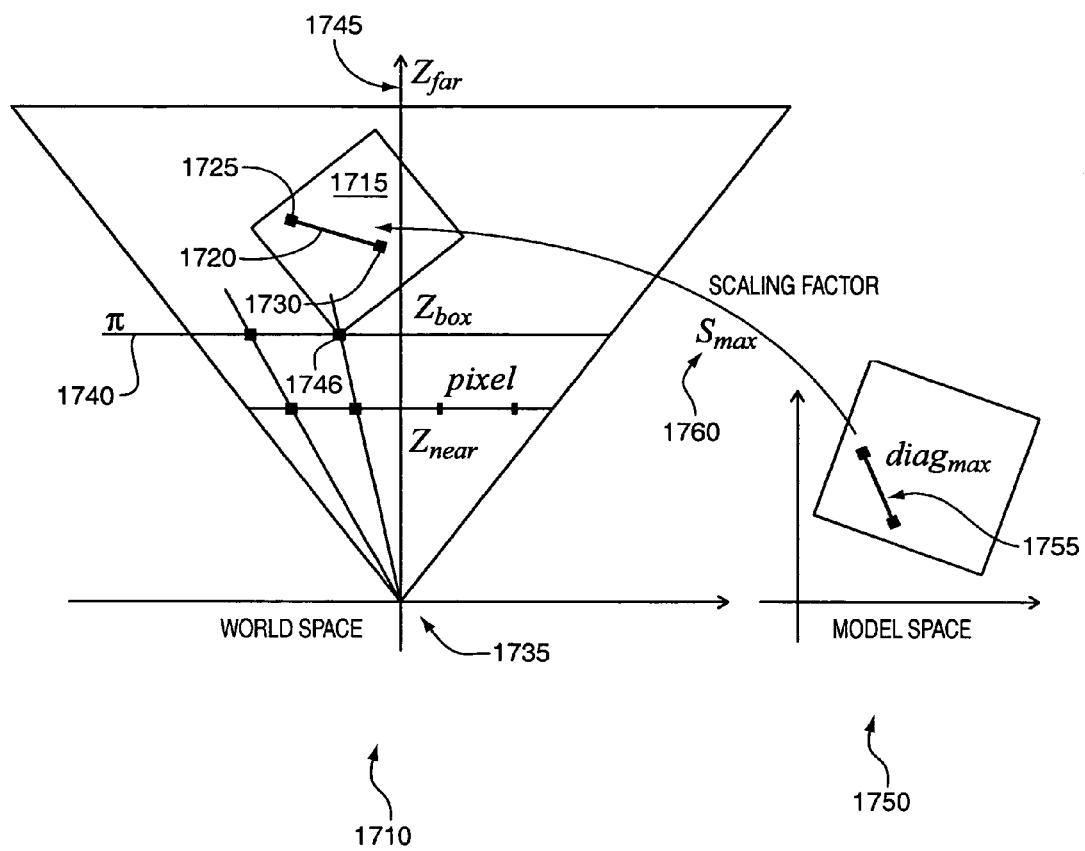
FIG. 17 conceptually illustrates estimating a length of a maximal diagonal of a spatial patch, according to one embodiment.

FIG. 17 conceptually illustrates estimating a length of a maximal diagonal in screen coordinates, according to one embodiment. A world space view 1710 includes a spatial patch bounding box 1715 having a maximal diagonal 1720 between a first node 1725 and a second node 1730. A model space view 1750 contains a corresponding maximal diagonal 1755 with a length denoted as $diag_{max}$. Maximal diagonal 1720 or maximal diagonal 1755 may be calculated in real time, stored with the spatial patch (it only depends on the spatial patch data) or otherwise determined. Transformation from model to world space may change the length of maximal diagonal 1755, but the maximum scaling factor 860 ($S_{max}$), may be easily deduced from the corresponding orthogonal matrix. Because the projective transformation makes objects at a greater z-distance from the origin 1735 of the world coordinate system look smaller in size, the projection of any diagonal is smaller than the projection of an equal segment lying on the plane π 1740, which is perpendicular to the z axis 1745 and passes through the closest vertex 1746 of the bounding box 1715. Denoting the z coordinate of the closest bounding box vertex with Zbox, the criteria may be expressed as follows:

$$z_{near} \cdot S_{max} \cdot diag_{max} < z_{box} \cdot pixel$$

The criterion itself may be implemented with just a few additional multiplications for each spatial patch and should not usually slow rendering down in the case of failure.

In the event that the criterion is satisfied, at least part of the quadrilateral rendering or interpolation processing operations may be avoided by processing according to block 844. Block 844 may involve performing a subset of the remaining other operations of method 800, such as one disregarding at least some of the interpolation processing discussed for block 865. Rather than a subset, entirely different processing that may be more compatible with the determination may be used. Advantageously, such intelligent processing of spatial patches may lead to improved rendering performance. After rendering according to block 844, the method 800 advances to block 880 (block 846 shows the transition between FIGS. 8A and 8B).

Presenting Graphical Data

The method 800 advances from decision 879 and block 844 to block 880, where graphical data may be presented. This may include presenting the graphical data to a presentation device or to other hardware or software that performs further processing of the graphical data before it is finally presented as computer graphics. For example, in the case of a display device, the graphical data may be presented via a frame buffer to a display adapter that converts the processed spatial patch graphical data into device-compatible electrical signals appropriate for a presentation device. Presentation to other presentation devices (e.g., a 3D TV, a film recorder, a DVD or CD ROM burner, a printer, a plotter, a fax machine) is also contemplated. The method 800 terminates at block 885.

Buffer Management

Those having an ordinary level of skill in the art will appreciate that various memory management strategies may be used to improve efficiency and/or speed of spatial patch processing. To illustrate this point, a brief discussion of memory management of the recursive subdivision operations will be provided. Other approaches will be apparent.

According to one embodiment, one or more of point buffering, coding, and a linear nodes buffer may be used in the recursive approaches discussed in the detailed description. The linear nodes buffer may be used in such a way that only nodes that may potentially be re-computed are stored, in order to allocate the least possible memory space. The linear nodes buffer may take advantage of regular or predetermined traversal of the quadrilaterals and recognize that an intermediate node evaluated for one quadrilateral may contain information useful to subdivision of another subsequent quadrilateral in the traversal. This information may be in the buffer and may not need recalculation. Codes may be used to indicate or define the order in which nodes appear or are produced in the recursion. These codes may be generated in a manner very similar to generation of codes used during Huffinan encoding. Often codes for parent nodes will propagate in some way to children nodes.

According to one embodiment, one linear buffer for x and one linear buffer for y may be used to store the nodes and a coding number for the other dimension. These may be allocated as a single array that is used from both sides. This may take advantage of a characteristic of certain subdivisions, that for each dimension (x or y) and for each coding number there is usually only one node once computed and needed for further subdivision.

Parallel Processing

The proposed rendering strategy for spatial patches can be implemented using parallelism on different levels. The SIMED (Single Instruction Multiple Data) approach can be applied to coordinate triples, quads, and often to all of the node data. Thus, node coordinates and displacement vectors may be processed identically in the node traversal stage. Likewise, coordinates and colors may be interpolated in the same manner in the quadrilateral rendering stage. Others are contemplated. Additions and bitwise shifts on six-tuples or twelve-tuples may be executed in parallel by a single instruction.

During the quadrilateral subdivision process the two internal nodes may be computed in the same or a similar manner. Since the source data used to determine them may be different, separate and independent computing units may be used in parallel.

Often each spatial patch is a separate object that is expected to be relatively small. This may allow partitioning the frame buffer, such as into rectangular areas called chunks. Each chunk may be provided with a separate rendering unit. This approach is highly efficient if spatial patch clipping caused by internal partitioning occurs rarely. Introducing small internal guard bands can help a lot in this case.

Other Spatial Patch Processing

Those having an ordinary skill in the art will recognize that there are a number of strategies for processing spatial patches. Although a specific method 800 of spatial patch processing has been described, different methods and variations of the described method 800 are contemplated. For example, rather than method 800 being conceptually spatial patch oriented, it may be pixel oriented, wherein a loop is over pixels of the display and processing the spatial patches, or portions thereof, which impact them.

Exemplary Computer Architecture

As discussed herein, a "system" or "computer system", such as a system for accessing, processing, and rendering a spatial patch, may be an apparatus including hardware and/or software for processing data. The system may include, but is not limited to, a computer (e.g., portable, laptop, desktop, server, mainframe, etc.), hard copy equipment (e.g., optical disk burner, printer, plotter, fax machine, etc.), and the like. A computer system 1800 representing an exemplary workstation, host, or server in which features of the present invention may be implemented will now be described with reference to FIG. 18. The computer system 1800 represents one possible computer system for implementing embodiments of the present invention, however other computer systems and variations of the computer system 1800 are also possible. The computer system 1800 comprises a bus or other communication means 1801 for communicating information, and a processing means such as processor 1802 coupled with the bus 1801 for processing information. The computer system 1800 further comprises a random access memory (RAM) or other dynamic storage device 1804 (referred to as main memory), coupled to the bus 1801 for storing information and instructions to be executed by the processor 1802. The main memory 1804 also may be used for storing temporary variables or other intermediate information during execution of instructions by the processor 1802. In one embodiment, the main memory 1804 may be used for computer applications, procedures, and data structures useful in certain embodiments of the invention. For example, the main memory 1804 may store spatial patches, computer graphics packages, photography and range-sensing software, computer games, web browsers, compression software, rendering software, and other types of spatial patch processing software. The main memory 1804 may also support stack and other types of memory use models and algorithms. The computer system 1800 also comprises a read only memory (ROM) and other static storage devices 1806 coupled to the bus 1801 for storing static information and instructions for the processor 1802, such as the BIOS. A data storage device 1807 such as a magnetic disk, zip, or optical disc and its corresponding drive may also be coupled to the computer system 1800 for storing information and instructions. In one embodiment, the data storage device 1807 may be used to store spatial patches and/or final computer graphics images generated by rendering the spatial patches.

The computer system 1800 may also include graphics hardware 1835 coupled to the bus. Graphics hardware 1835 may include any type of prior art graphics hardware that is desired for the particular implementation or that is available on the computer system. For example, the graphics hardware 1835 may include a display adapter, a frame buffer, a double buffered frame buffer, a Z-buffer, a display processor, a display processor memory, graphics processor chips, special memory (e.g., dynamic RAM (DRAM), video ram (VRAM)), a peripheral display processor, an Accelerate Graphics Port (AGP), available from Intel Corporation of Santa Clara, Calif., among other vendors. Other graphics processing circuitry may be desired, depending on the particular implementation.

In one embodiment, the spatial patch will have a simple data structure that may be implemented with CPU extensions without the need for a Graphics Processing Unit (GPU) or similar device. This will generally result in a simpler computer architecture and/or data management. However, in other embodiments it may be desirable to implement spatial patches using one or more GPUs.

Typically the graphics hardware 1835 will include a display adaptor to convert computer graphics data into electronic signals (either analog or digital) compatible with the display device. For example, the display adaptor may convert a bitmap in a memory into signals that refresh a screen of a display device. The display adapter may determine maximum resolution, maximum refresh rate, and colors allowed by the monitor. The display adaptor may be specific to a particular type of display device. The display adaptor may be built onto the motherboard (e.g., in a laptop), or be an expansion board that plugs into a computer system. The display adapters may contain memory, such as a frame buffer, to build computer graphics. Display adapters are known by other terms in the art. For example, display adapters are sometimes called graphics adapters, graphics controllers, video display adapters, video controller, VGA controller, and other terms.

The graphics hardware 1835 may also include a direct connection between the display adapter and memory, such as an AGP. This may permit spatial patches to be stored in main memory, which is more expansive than a video memory, while retaining high data transfer rates between memory, the CPU, and the display adaptor.

Typically the graphics hardware 1835 will include a frame buffer to store or hold graphics data, such as a bitmapped image, while it is painted to the display. Typically the frame buffer has the same size as a size of the display screen. The frame buffer may have a plurality of memory planes to each hold one or more bits corresponding to a pixel. The frame buffer may be double buffered to accelerate execution.

The graphics hardware 1835 may also include graphics hardware, such as a z-buffer, to assist with visibility determination. The z-buffer may be used in conjunction with a system and method for resolving visibility of a spatial patch. According to one embodiment, a z-buffer stores displacements from spatial patches. Different objects can have the same x- and y-coordinate values, but with different z-coordinate values. The object with the lowest z-coordinate value is in front of the other objects, and therefore that's the one that's displayed.

Processing of spatial patches may be done in parallel or with pipelining. Typically, the graphics hardware will support either parallel instruction execution or pipelined instruction execution, in order to improve the speed of rendering computer graphics. Multiple processing units may be provided to operate on patches in parallel. Each processing unit may use SIMD instructions to operate on multiple data (e.g., vectors, arrays) from each patch. In certain embodiments, the graphics hardware 1835 may have a direct bus connection to memory, such as main memory 1804, to prevent data accesses from burdening the bus 1801.

The computer system 1800 may also be coupled via the bus 1801 to a display device 1821, such as a cathode ray tube (CRT) or Liquid Crystal Display (LCD), for displaying information to an end user. The display device may be used to display graphics generated from spatial patches as well as by traditional methods. Other display devices, such as printers, film recorders, DVD burners, and other equipment are also contemplated. Typically, a data input device 1822, such as a keyboard or other alphanumeric input device including alphanumeric and other keys, may be coupled to the bus 1801 for communicating information and command selections to the processor 1802. Another type of user input device is a cursor control device 1823, such as a mouse, a trackball, or cursor direction keys for communicating direction information and command selections to the processor 1802 and for controlling cursor movement on the display 1821.

A communication device 1825 is also coupled to the bus 1801. Depending upon the particular implementation, the communication device 1825 may include a modem, a network interface card, or other well-known interface devices, such as those used for coupling to Ethernet, token ring, or other types of physical attachment for purposes of providing a communication link to support a local or wide area network, for example. In any event, in this manner, the computer system 1800 may be coupled to a number of clients or servers via a conventional network infrastructure, such as a company's intranet, an extranet, or the Internet, for example. The communication device may be used to send spatial patches, spatial patch processing instructions, or computer graphics generated from spatial patches over the network infrastructure.

A 3D capture system 1836 is also coupled to the bus 1801 in certain embodiments. The 3D capture system may allow spatial patches to be generated or acquired for a real object using the appropriate sensing equipment. For example, spatial patch data may be acquired using photography-like equipment and processing that senses light emission from an object and displacement map data may be acquired using range-sensing equipment (e.g., a scanner) and processing that senses the geometric extents of the real object. Software may be provided to connect appearance data and displacement data for a node. Other embodiments may not include the 3D capture system 1836.

Embodiments of the invention are not limited to any particular computer system. Rather, embodiments may be used on any stand alone, distributed, networked, or other type of computer system. For example, embodiments may be used on one or more computers compatible with NT, Linux, Windows, Macintosh, any variation of Unix, or others.

Embodiments of the invention include various operations, as described above. The operations may be performed by hardware components or may be embodied in machine-executable instructions, which may be used to cause a general-purpose or special-purpose processor or logic circuits programmed with the instructions to perform the operations. Alternatively, the operations may be performed by a combination of hardware and software.

Embodiments of the invention may be provided as a computer program product that may include a machine-readable medium having stored thereon instructions that may be used to program a computer (or other electronic devices) to perform a process according to the present invention. The computer program product may also store data structures of certain embodiments of the invention. The machine-readable medium may include, but is not limited to, magnetically or optically machine-readable mediums, floppy diskettes, optical disks, CDs (e.g., CD-ROMs), DVDs (e.g., DVD-ROMs), magneto-optical disks, ROMs, Erasable Programmable ROMs (EPROMs), Electrically Erasable Programmable ROMs (EEPROMs), flash memory, RAMs, dynamic RAM (DRAM), static RAM (SRAM), magnetic or optical cards, or other type of media/machine-readable medium suitable for storing electronic instructions and/or data structures. Moreover, the present invention may also be downloaded as a computer program product, wherein the program may be transferred from a remote computer to a requesting computer by way of data signals embodied in a carrier wave or other propagation medium via a communication link (e.g., a modem or network connection).

In conclusion, the present invention provides an approach for representing and rendering graphical objects with spatial patches.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A machine-readable data structure stored on a machine-readable medium comprising a graphical primitive to represent only a portion of a surface of an object, the data structure comprising:
    appearance data that indicates an appearance for each of a plurality of nodes of the graphical primitive that are associated with the portion of the surface of the object;
    displacement data of the graphical primitive that indicates displacement distances for the nodes from corresponding reference nodes; and
    local coordinate system data of the graphical primitive that indicates a local coordinate system for the plurality of nodes of the graphical primitive.

2. The machine-readable data structure of claim 1, wherein the displacement data indicates displacement distances for the nodes from a plurality of regularly spaced reference nodes that are arranged in a grid.

3. The machine-readable data structure of claim 1, wherein the displacement data indicates displacement distances for the nodes from a plurality of regularly spaced reference nodes that are in a base plane in the local coordinate system.

4. The machine-readable data structure of claim 1:
    wherein the coordinate system data indicates a base plane; and
    wherein the displacement data indicates displacement distances from
    corresponding reference nodes in the base plane.

5. The machine-readable data structure of claim 1, wherein the local coordinate system data comprises coordinates for the reference nodes, and wherein the reference nodes are regularly spaced and are arranged in a grid.

6. The machine-readable data structure of claim 1, wherein the local coordinate system data comprises data sufficient to indicate an origin, a first axis, a second axis, and a length associated wit the first axis.

7. The machine-readable data structure of claim 1, wherein the data structure comprises appearance data and displacement data for a multiple of $2^k+1$ nodes, where k is a positive integer.

8. The machine-readable data structure of claim 1, wherein the displacement data indicates independent displacement distances for the nodes.

9. A method comprising performing one or more rendering calculations using the data of the machine-readable data structure of claim 1.

10. A method comprising sending the machine-readable data structure of claim 1 over the Internet.

11. A method comprising:
  accessing graphical data of a graphical primitive having a plurality of nodes that represent only a portion of a surface of a three-dimensional object, the graphical data including:
    appearance data that indicates an appearance for each of the plurality of nodes of the graphical primitive;
    displacement data of the graphical primitive that indicates displacement distances for the nodes from corresponding reference nodes; and
    local coordinate system data of the graphical primitive that indicates a local coordinate system for the plurality of nodes of the graphical primitive; and
  performing one or more rendering calculations using the data; and
  presenting results of the one or more rendering calculations on a presentation device.

12. The method of claim 11, wherein said accessing comprises accessing graphical data including displacement data that indicates displacement distances for the nodes from a plurality of regularly spaced nodes arranged in a grid.

13. The method of claim 11:
  wherein said accessing the local coordinate system data includes accessing data sufficient to define a base plane; and
  wherein said performing the one or more rendering calculations includes determining displaced nodes by combining displacement distances with corresponding reference nodes in the base plane.

14. The method of claim 11, wherein accessing includes accessing graphical data for a multiple $2^k 30$ nodes, where k is a positive integer.

15. The method of claim 11, wherein said performing the one or more rendering calculations comprises:
  determining four pixels of a quadrilateral that correspond to four nodes of the plurality of nodes, the quadrilateral having a quadrilateral dimension;
  determining an inner pixel contained within the quadrilateral by comparing the quadrilateral dimension with a pixel dimension; and
  determining a value for the inner pixel by using values for at least one of the four pixels.

16. The method of claim 11, wherein said performing the one or more rendering calculations comprises removing a node of the plurality if the node lies outside of a view volume by clipping.

17. The method of claim 11, wherein said performing the one or more rendering calculations comprises modifying a color value based on lighting calculations, the lighting calculations including calculating a normal vector by forming a vector product of tangents associated with neighboring nodes.

18. The method of claim 11, wherein said accessing the graphical data comprises accessing displacement data that indicates independent displacement distances for the nodes.

19. A machine-readable medium having stored thereon data representing sequences of instructions that when executed cause a machine to:
  access graphical data of a graphical primitive having a plurality of nodes that represent only a portion of a surface of a three-dimensional object, the graphical data including:
    appearance data that indicates an appearance for each of the plurality of nodes of the graphical primitive;
    displacement data of the graphical primitive that indicates displacement distances for the nodes from corresponding reference nodes; and
    local coordinate system data of the graphical primitive that indicates a local coordinate system for the plurality of nodes of the graphical primitive; and
  performing one or more rendering calculations using the data.

20. The machine-readable medium of claim 19:
  wherein the instructions to access the local coordinate system data include instructions that when executed cause the machine to access data sufficient to define a base plane and a plurality of regularly spaced reference nodes that are arranged in a grid; and
  wherein the instructions to perform the one or more rendering calculations include instructions that when executed cause the machine to determine displaced nodes by combining displacement distances with the corresponding regularly spaced reference nodes.

21. An apparatus comprising:
  a graphics adapter;
  a rendering unit of the graphics adapter;
  logic of the rendering unit to render graphical data of a graphical primitive that represents only a portion of a surface of a three-dimensional object, the graphical data including:
    appearance data that indicates an appearance for each of a plurality of nodes of the graphical primitive;
    displacement data of the graphical primitive that indicates displacement distances for the nodes from corresponding reference nodes; and
    local coordinate system data of the graphical primitive that indicates a local coordinate system for the plurality of nodes of the graphical primitive.

22. The apparatus of claim 21, wherein the rendering unit comprises logic to determine displaced nodes by combining indicated displacement distances with a plurality of reference nodes indicated in the graphical data which are regularly spaced and arranged in a grid.

23. The apparatus of claim 21:
  wherein the coordinate system data indicates a base plane; and
  wherein the displacement data indicates displacement distances from corresponding reference nodes in the base plane 24. The apparatus of claim 21, wherein the local coordinate system data comprises data sufficient to indicate an origin, a first axis, a second axis, and a length associated with the first axis.

25. The apparatus of claim 21, wherein the rendering unit resides on an expansion board of the graphics adapter.

26. The apparatus of claim 25, wherein the expansion board comprises a memory.

27. A method comprising plugging the apparatus of claim 21 into a computer system including a communication device.

28. A system comprising:
a bus;
a memory coupled with the bus;
a processor coupled with the bus;
a communication device coupled with the bus; and
a rendering unit having logic to render a graphical data of a graphical primitive that represents only a portion of a surface of a three-dimensional object, the graphical data including:
appearance data that indicates an appearance for each of a plurality of nodes of the graphical primitive;
displacement data of the graphical primitive that indicates displacement distances for the nodes from corresponding reference nodes; and
local coordinate system data of the graphical primitive that indicates a local coordinate system for the plurality of nodes of the graphical primitive.

29. The system of claim 28, wherein the rendering unit comprises logic to determine displaced nodes by combining indicated displacement distances with a plurality of reference nodes indicated in the graphical data which are regularly spaced and arranged in a grid 30. The system of claim 28, wherein the local coordinate system data comprises data sufficient to indicate an origin, a first axis, a second axis, and a length associated with the first axis.

31. The system of claim 28, further comprising a second rendering unit coupled with the bus to render a spatial patch in parallel with the rendering of said data structure.

32. The system of claim 28, wherein the rendering unit resides on an expansion board that is plugged into the system.

33. The system of claim 28, wherein the rendering unit resides on a motherboard of the system.

* * * * *